US006437780B1

(12) United States Patent
Baltaretu et al.

(10) Patent No.: US 6,437,780 B1
(45) Date of Patent: Aug. 20, 2002

(54) METHOD FOR DETERMINING TILES IN A COMPUTER DISPLAY THAT ARE COVERED BY A GRAPHICS PRIMITIVE

(75) Inventors: Oana Baltaretu, Palo Alto; David L. Dignam, Belmont; Sanjay O. Gupta, Fremont, all of CA (US)

(73) Assignee: Nvidia US Investment Company, Santa Clara, CA (US)

( * ) Notice: Subject to any disclaimer, the term of this patent is extended or adjusted under 35 U.S.C. 154(b) by 0 days.

(21) Appl. No.: 09/271,637

(22) Filed: Mar. 17, 1999

(51) Int. Cl.[7] ............................................. G06T 17/20
(52) U.S. Cl. ..................... 345/423; 345/441; 345/443; 345/620
(58) Field of Search ................................. 345/423, 440, 345/441, 420, 434, 433, 426, 619, 620, 443

(56) References Cited

U.S. PATENT DOCUMENTS 5,343,558 A * 8/1994 Akeley ........................ 395/126
6,034,699 A * 3/2000 Wong et al. ................. 345/441

OTHER PUBLICATIONS

Foley et al., "Computer Graphics, Principles and Practice", Second Edition in C, 1990, pp. 336–337.
Foley et al., "Computer Graphics, Principles and Practice", Second Edition in C, 1990, pp. 660–663.

* cited by examiner

Primary Examiner—Mark Zimmerman
Assistant Examiner—Mano Padmanabhan
(74) Attorney, Agent, or Firm—Townsend and Townsend and Crew LLP

(57) ABSTRACT

A geometry tiler identifies tiles on a computer's screen that are covered by a graphics primitive by use of edges of the graphics primitive. Precise identification of tiles of various types (such as edge tiles covered by a segment) eliminates identification of one or more tiles that are merely located adjacent to the graphics primitive, but are not touched by the graphics primitive. For example, the geometry tiler can identify each of three types of tiles: vertex tiles, edge tiles and interior tiles. In one implementation, the geometry tiler identifies all tiles that are covered by a graphics primitive in the form of a convex polygon by: (a) determining attributes of at least one segment in the convex polygon, (b) determining iteration descriptors for each segment by using the attributes, (c) for each segment in the convex polygon, scanning the segment and identifying each edge tile that is covered by the segment, and (d) for each column of tiles in the screen, going from one edge tile in the column to another edge tile in the column and identifying each interior tile that is located within an area enclosed by the segments of the primitive. In one specific implementation, the geometry tiler simultaneously identifies edge tiles that are covered by two segments of the convex polygon that are located opposite to each other (such as a top segment and a bottom segment).

25 Claims, 17 Drawing Sheets

METHOD FOR DETERMINING TILES IN A COMPUTER DISPLAY THAT ARE COVERED BY A GRAPHICS PRIMITIVE

CROSS REFERENCE TO RELATED APPLICATION

This application is related to, and incorporates by reference herein in their entirety, the following concurrently filed, commonly owned U.S. patent applications:

Ser. No. 08/978,491, filed on Nov. 25, 1997, by Ming Benjamin Zhu, entitled "Rendering Pipeline";

Ser. No. 09/271,636, filed on Mar. 17, 1999, by Ming Benjamin Zhu et al., entitled "Optimized System and Method For Binning of Graphics Data";

Ser. No. 09/271,026, filed on Mar. 17, 1999, by Ming Benjamin Zhu et al., entitled "A Circuit and Method For Deferring the Binding of Render States To Primitives In a Graphics System"; and Ser. No. 09/271,613, filed on Mar. 17, 1999, by Scott C. Heeschen et al., entitled "A Circuit And Method For Processing Render Commands In A Tile-Based Graphics System".

CROSS REFERENCE TO MICROFICHE APPENDIX

Appendix A, which is part of the present disclosure, is included in a microfiche appendix consisting of 1 sheet of microfiche having a total of 31 frames, and the microfiche appendix is incorporated herein by reference in its entirety. Microfiche Appendix A is a listing of pseudo code for computer programs and related data that can be prepared in the language VERILOG for implementing circuitry including a synchronizer that receives and stores graphics data for the generation of a screen display, for use with one illustrative implementation of this invention as described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

A personal computer 10 (FIG. 1A) includes a graphics processor 14 that generates a display of a three-dimensional (abbreviated as "3D") image on a screen 11 under the control of a central processing unit 15. Graphics processor 14 forms the displayed image from descriptions of one or more graphics primitives, such as a line 16 (FIG. 1B) that connects points "A" and "B", a triangle 17 (FIG. 1C) that connects points "C," "D," and "E," a fan 18 (FIG. 1D) and a strip 19 (FIG. 1E).

The image displayed on screen 11 is typically formed by a two-dimensional array of picture elements (called "pixels") P101–P109 (not all pixels are labeled in FIG. 1F) each of which has one or more attributes (such as color or texture). To reduce the hardware required to process all pixels at once, a screen 11 is subdivided into rectangular areas (called "tiles") T1–TN, and each tile TI contains an equal number of pixels (e.g. 16 pixels) that form a portion of the displayed image. Each tile TI (in this example formed by the sixteen pixels being arranged in a square four pixels tall and four pixels wide) is held and processed one at a time in an on-chip memory included in graphics processor 14.

In such a "tiled" architecture, it is necessary to determine the identities of tiles that are covered by one or more graphics primitives (such as triangles 110 and 120 in FIG. 1F) that are to be displayed on screen 11. In the example illustrated in FIG. 1F, triangle 110 has vertices 111–113 and sides 114–116, whereas triangle 120 has vertices 112, 113 and 117, and sides 116, 118 and 119. The touching of a tile TI (wherein $1 \leq I \leq N$) by triangles 110 and 120 is indicated by the presence (or absence) of the triangles' identifiers in a "bin" associated with tile TI, as shown in Table 1 below:

TABLE 1

| Tile | Bin | Tile | Bin | Tile | Bin |
| --- | --- | --- | --- | --- | --- |
| T1 | — | T11 | — | T21 | 110, 120 |
| T2 | — | T12 | — | T22 | 120 |
| T3 | 110 | T13 | — | T23 | 120 |
| T4 | 110 | T14 | 110 | T24 | — |
| T5 | — | T15 | 110 | T25 | — |
| T6 | — | T16 | 110, 120 | T26 | 110, 120 |
| T7 | — | T17 | 120 | T27 | 120 |
| T8 | — | T18 | — | T28 | 120 |
| T9 | 110 | T19 | — | T29 | 120 |
| T10 | 110 | T20 | 110 | T30 | — |

For convenience, not all bins are shown in Table 1. One prior art method (also called "brute force" method) for the "binning" of triangles (that is performed to obtain Table 1) examines each tile TI (wherein $1 \leq I \leq N$) in screen 11, and checks whether any of triangles 110 and 120 covers tile TI.

Another prior art method (also called "bounding box" method) uses a rectangle (called "bounding box") that touches the vertices of a triangle to be binned, and identifies all tiles within such a bounding box. For example, a bounding box 121 can be drawn around vertices 111–113 of triangle 110, followed by identification of tiles T2–T4, T8–T10, T14–T16, T20–T22 and T26–T28 that are located within bounding box 121.

The bounding box method results in certain tiles (e.g. tiles T2 and T8) being identified although these tiles are not touched by the triangle being binned (e.g. triangle 110). However, the bounding box method eliminates the need to examine (for triangle 110) tiles that are outside of bounding box 121 (such as tiles T1, T5–T7, T11–T13, T17–T19, T23–T25 and T29–TN). Therefore, the bounding box method is more efficient than the brute force method. Bounding boxes (also called "extent" boxes) are described in the book entitled "Computer Graphics, Principles and Practice" by Foley, van Dam, Feiner and Hughes, Addison-Wesley Publishing Company, Second Edition in C, 1996 (see pages 660–663; see also pages 336–337).

SUMMARY

A circuit (hereinafter "geometry tiler") in accordance with this invention implements a method described herein to identify one or more tiles (in the form of, e.g. rectangular areas) on a computer's screen that are covered by (or touched by) a convex polygon (defined to be a polygon wherein each diagonal is fully contained within the polygon, and wherein each diagonal connects two vertices that do not belong to the same line segment of the polygon). Specifically, the geometry tiler identifies tiles (either precisely or approximately) by use of edges of the graphics primitive.

In one embodiment, the geometry tiler identifies the following types of tiles that are covered by or touched by a convex polygon: (a) vertex tiles, (b) edge tiles, and (c)

interior tiles. Vertex tiles are tiles that are covered by the vertices of the convex polygon. Edge tiles are tiles that are not at the vertices, and are covered by or touched by line segments that form edges of the convex polygon. Interior tiles are tiles that are not covered by the edges or the vertices of a convex polygon, but are covered by an area enclosed by the convex polygon.

In one implementation, the geometry tiler includes a separate and distinct component for identifying (e.g. by driving on a predetermined bus a signal indicative of the item to be identified) two types of tiles: a vertex tiler that identifies vertex tiles, and a segment scanner that identifies edge tiles. The geometry tiler also includes an interior enumerator that identifies all tiles (including interior tiles, edge tiles and vertex tiles) that are covered by the convex polygon. Note that other implementations of a geometry tiler may have fewer components or more components than described herein. In this implementation, edge tiles along two opposing segments (e.g. a bottom segment and a top segment) of the convex polygon are identified simultaneously, so that all edge tiles are identified when scanning from a left most vertex to a right most vertex is completed.

Identification of edge tiles as described herein eliminates identification of one or more tiles (hereinafter "untouched" tiles) that are merely located adjacent to a convex polygon, but are not covered or touched by the convex polygon. Specifically, identification of tiles in a precise manner as described herein (e.g. identification of only those tiles that are covered by a to-be-displayed polygon) eliminates the prior art identification of tiles that are neither covered nor touched by the convex polygon.

Elimination of one or more untouched tiles from the identified tiles as described herein reduces both time and storage as follows. Elimination of untouched tiles reduces the time otherwise required in the prior art to identify the tiles to be processed for displaying a primitive, and the time to process the identified tiles for display. Moreover, elimination of one or more untouched tiles from the identified tiles also reduces the number of storage locations otherwise required in the prior art to hold the identities of the tiles to be processed, and the memory bandwidth otherwise required to transfer the tile identities to other circuits.

In one embodiment, a geometry tiler evaluates a function (also called "test function") to determine the location of a current tile relative to the convex polygon (specifically, relative to a line segment of the convex polygon). One example of such a test function is the line function $F(x,y)=ax+by+c$ that is based on Cartesian coordinates $(x,y)$ and on the mathematical representation $y=mx+n$ (wherein $m=(-a/b)$ is the slope and $n=(-c/b)$ is the y intercept at $x=0$ if b is not 0) of a line passing through a segment of the convex polygon. Line function $F(x,y)$ has a value that is equal to zero when a point $(x,y)$ is on the line, and the value is positive on one side of the line and negative on another side of the line. In one implementation, line function $F(x,y)$ is set up (for each line segment of the convex polygon) to have a positive value on a line's side that contains the interior of the convex polygon.

In another implementation, function $F(x,y)$ is set up for an edge, and values of the function are determined at various corners of a current tile. If the values are positive at all four corners, the current tile is above and to the left of the edge if the slope of the edge is positive and if the interior of the polygon is below the edge. Similarly, if the values are negative at all four corners, the current tile is below and to the right of the edge. If some values of $F(x,y)$ at the four corners of a tile are positive, and other values are negative, the current tile covers the edge (assuming the current tile is a tile between two vertex tiles). One or more of these three tests (of the sign of the line function's value) are used to identify as edge tiles only those tiles that are covered by the edges of the convex polygon. Thereafter, identification of all tiles that are located between edge tiles yields interior tiles covered by the convex polygon.

In one embodiment, the geometry tiler starts at a vertex of the convex polygon, and identifies as the current tile a tile that contains the vertex. If an edge of the convex polygon extends from the current tile upwards and to the right (as determined from a positive slope m), the sign of the function's value is positive at all points to the left and above the edge, if the interior of the polygon is above the edge. The sign is negative at all points below and to the right of the edge if the interior of the polygon is below the edge. The function's sign at the upper right corner of the current tile indicates whether the edge passes through the upper side of the current tile or the right side of the current tile.

A geometry tiler of this embodiment identifies a covered side of a tile by evaluating the function at just one corner of the current tile. In an alternative embodiment, the geometry tiler evaluates the function at each of three corners of the tile (in the example, the upper left, upper right and lower right corners of the tile). The geometry tiler determines the corners of the tile at which the evaluated function has different signs, and identifies the side passing through these corners to be the tile's side covered by the edge. The edge covers a tile's side that passes through corners at which the evaluated function has different signs.

In one particular implementation, the function is $Fnew=Fold+\Delta y*stepx-\Delta x*stepy$, wherein stepx is the distance along the x axis of a new position from an old position, stepy is the distance along the y axis of the new position from the old position, and Fold is a value of the function at the old position, $\Delta x$ is the projection distance of the edge along the x axis and $\Delta y$ is the projection distance of the edge along the y axis. An old position can be, for example, a left most end point of the edge, with Fold set to zero (by definition) at the left most end point.

The just-described implementation eliminates computation of the slope of a segment, and is therefore faster than other implementations (because the just-described implementation does not involve division). Moreover, in one example of this implementation stepx and stepy are both powers of 2 (such as 4, 16, 32 or 64), and the multiplication is accomplished by a shift operation that needs to be performed only once for each edge. So, the geometry tiler of this embodiment evaluates the line function to determine a side (also called "covered side") of a current tile through which an edge of a convex polygon passes.

The geometry tiler then selects a tile adjacent to the covered side to be the current tile (i.e. the covered side is common to both tiles). If the selected tile (hereinafter "current tile") is not covered by another end point of the edge, the geometry tiler returns to determining the current tile's side that is covered by the edge. In this manner, the geometry tiler iteratively moves from one end point of an edge to the other end point, while identifying tiles that are covered by the edge. As noted above, the geometry tiler also iterates between edge tiles covered by two different edges, and identifies all tiles located therebetween as interior tiles.

In one implementation, the geometry tiler performs the following four operations prior to identifying all tiles that are covered by or touched by a convex polygon: (a) determines attributes of the convex polygon (e.g. computes values related to line segments that form the convex polygon), (b) determines iteration descriptors by using the attributes (e.g. sorts vertices of the convex polygon to generate a list that contains vertices ordered along a scanning direction, and identifies "vertex tiles" as tiles covered by a vertex), (c) for each segment in the convex polygon, scans the segment and identifies each tile (called "edge tile") that is covered by the segment, and (d) for each column of tiles in the screen, scans from one edge tile in the column to another edge tile in the column and identifies all tiles (including edge tiles) that cover an area enclosed by the segments of the polygon.

As noted above, the geometry tiler of this implementation identifies all the tiles that are covered by a convex polygon. The tiles identified by the just-described geometry tiler do not include a significant number (e.g. up to half the total number in some cases) of tiles that are otherwise identified by the prior art method (such as the bounding box method). The elimination of identification of up to half the number of tiles (in some cases) reduces the prior art time required to process a convex polygon by half. Moreover, elimination of identification of up to half the tiles also reduces by half the number of storage locations otherwise required to hold the identities of tiles to be processed for a convex polygon and reduces by half the memory bandwidth otherwise required to transfer the identities to other circuits.

DETAILED DESCRIPTION

Figure 1A:
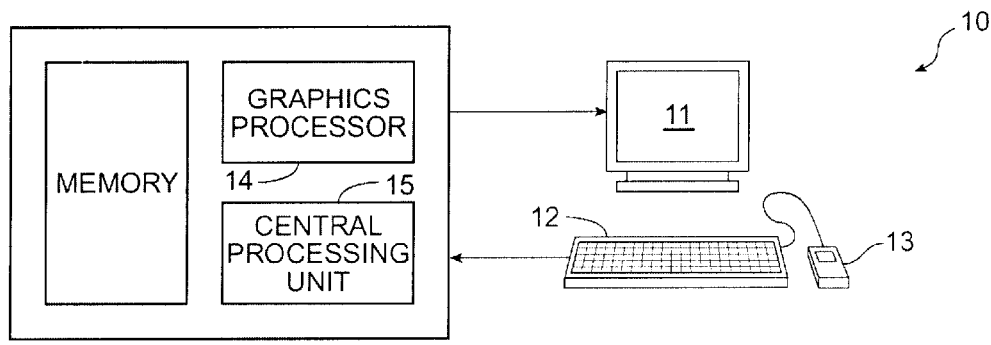
FIG. 1A illustrates a personal computer that includes a prior art graphics processor.
Figure 1B:
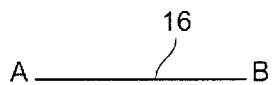
FIGS. 1B–1E illustrate graphics primitives used by the prior art graphics processor of FIG. 1A to display an image on the screen of the computer illustrated in FIG. 1A.
Figure 1C:
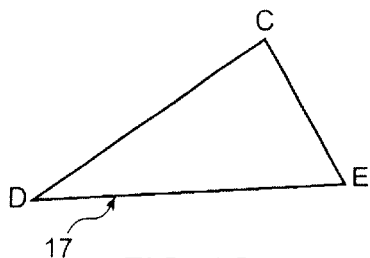
Figure 1D:
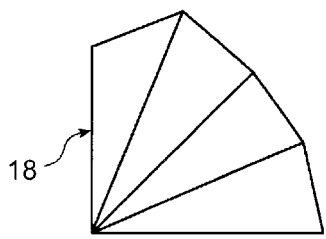
Figure 1E:
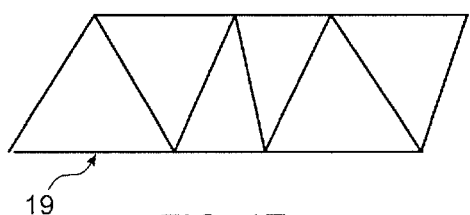
Figure 1F:
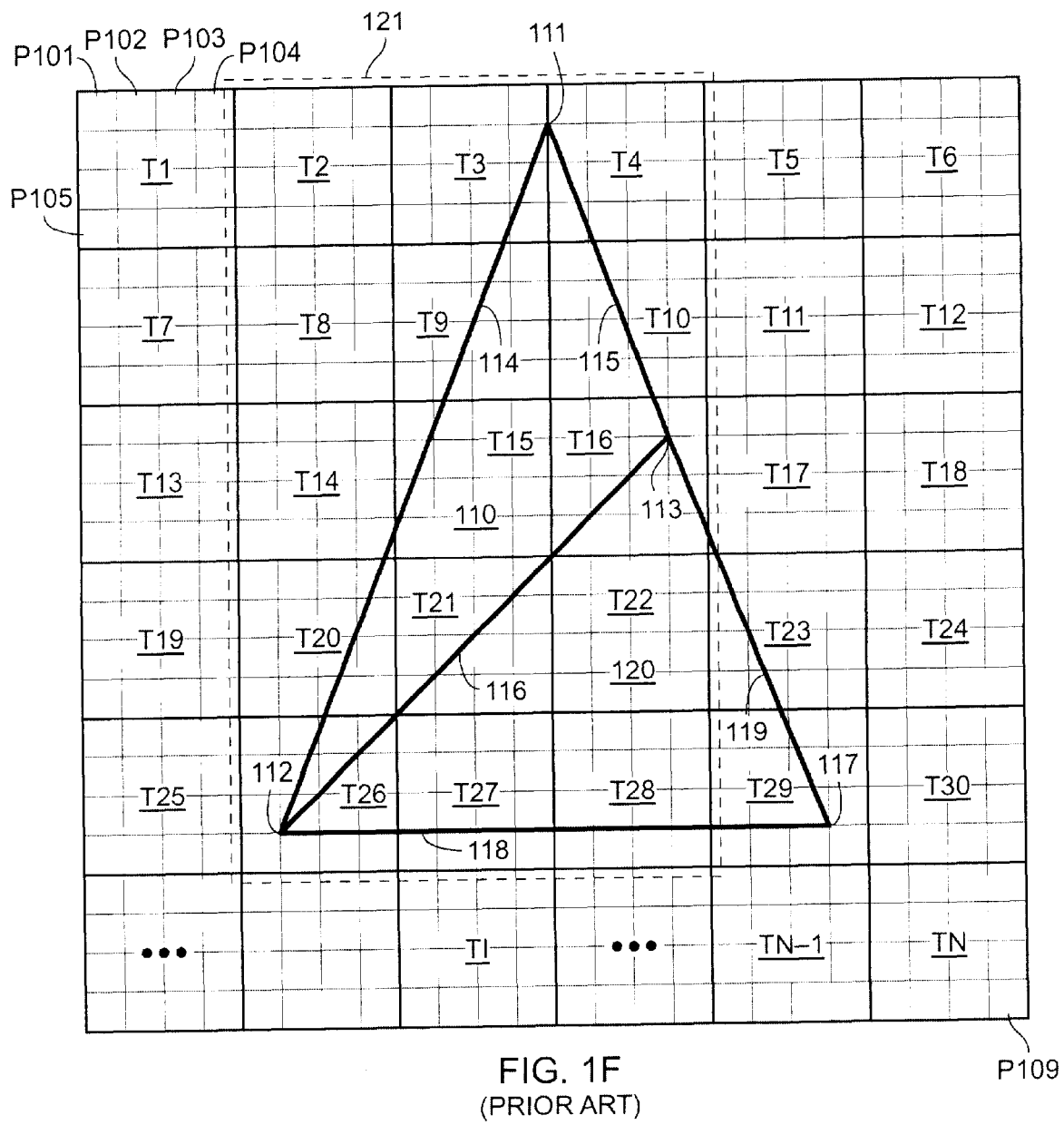
FIG. 1F illustrates, in an example, tiles on the screen of FIG. 1A, and use of a prior art bounding box method by the graphics processor of FIG. 1A to identify the tiles that are covered by a triangle.
Figure 2A:
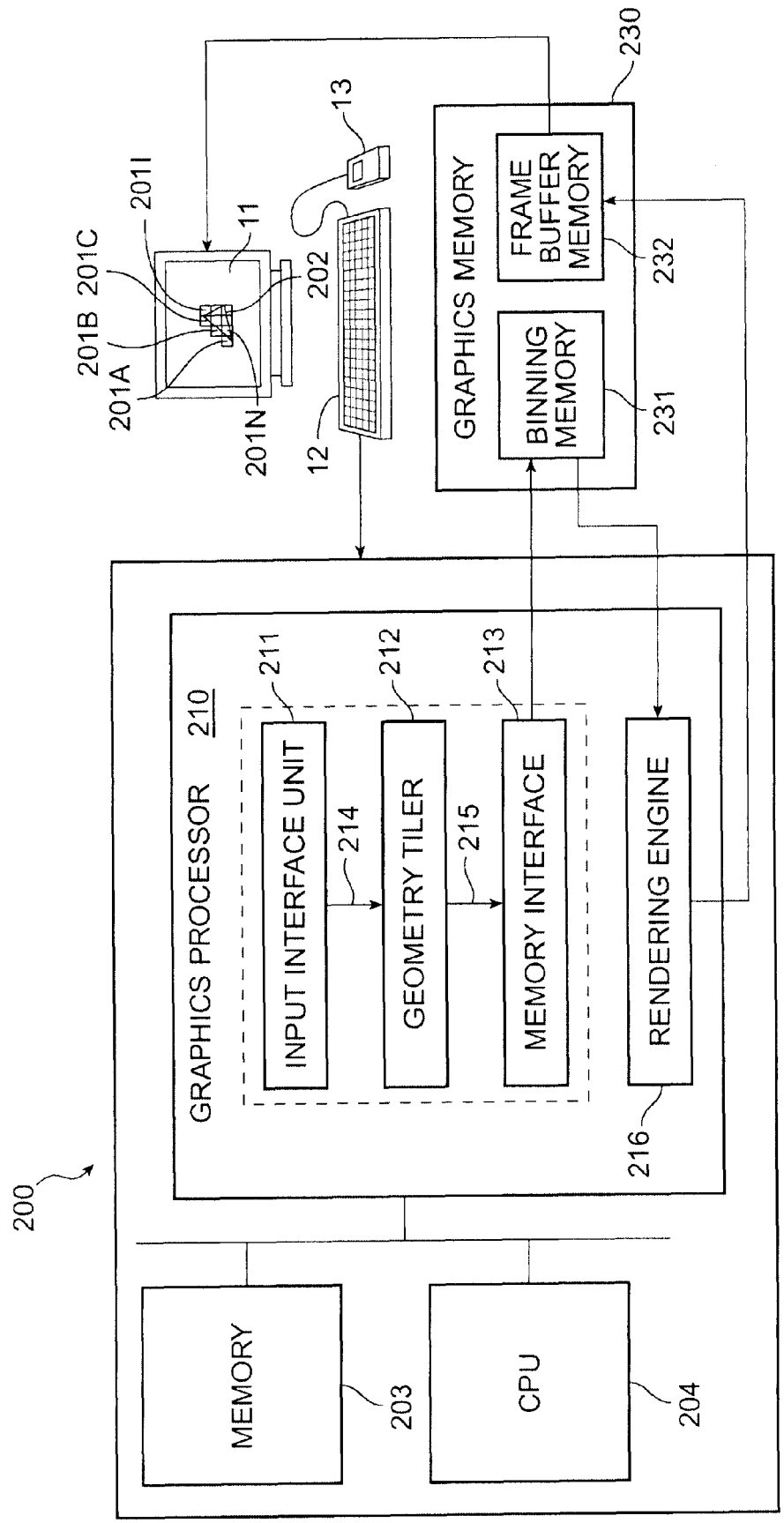
FIG. 2A illustrates a computer that includes a graphics pipeline that in turn includes a geometry tiler in accordance with the invention.

A computer 200 (FIG. 2A) in accordance with this invention includes a circuit (hereinafter "geometry tiler") 212 that implements a method described herein, and identifies tiles 201A–201N (wherein $A \leq I \leq N$) on a computer's screen 11 that are touched by a graphics primitive, such as convex polygon 202. Specifically, for each convex polygon received on an input bus 214, geometry tiler 212 identifies, on an output bus 215, tiles that are covered by the convex polygon (including vertex tiles, edge tiles and interior tiles that are described below).

Computer 200 can be any computer having a graphics pipeline 210 that includes geometry tiler 212, for example, a personal computer (PC), a graphics work station, or a game machine. Computer 200 includes a central processing unit (CPU) 204 and a memory 203 that are coupled to each other and to graphics pipeline 210.

In addition to geometry tiler 212, graphics pipeline 210 includes an input interface unit 211 that provides data (in the form of signals indicative of one or more convex polygons) to input bus 214 of geometry tiler 212. Graphics pipeline 210 also includes an output interface unit 213 that receives signals indicative of the tiles identified by geometry tiler 212 (via output bus 215), and stores the signals in a binning memory 231 (that is part of a graphics memory 230). A rendering unit 216 (also included in graphics pipeline 210) reads the stored signals (indicative of binned tiles) from binning memory 231, and generates pixels that are stored in a frame buffer memory 232 for display on screen 11.

Input interface unit 211, output interface unit 213 and renderer 216 can be implemented in any manner (for example as described in the concurrently filed U.S. Patent Application, [ATTORNEY DOCKET NUMBER M-7153], entitled "Optimized System and Method For Binning of Graphics Data" incorporated by reference above). Note that items 211, 213 and 216 can be implemented differently in other embodiments, and are not critical aspects of such other embodiments. For example, a remesher (not shown; discussed in detail in the just-referenced application) may receive a list of tiles identified by a triangle binner implementation of geometry tiler 212, and eliminate one or more redundant tiles from the list, and for each eliminated tile changes the geometry description for the tile to indicate a polygon that had been subdivided into a number of triangles provided as input to the triangle binner.

Geometry tiler 212A identifies edges of a polygon (such as a triangle) from the x, y coordinates of the vertices, and thereafter uses the edges to identify tiles (also called "covered tiles") that are covered by the polygon. Although in many implementations the just-described covered tiles are enclosed within or located at the edge of the polygon, in one implementation (described below as an "approximate" implementation) one or more such covered tiles may be located outside the polygon (i.e. not even touched by the polygon).

Figure 2B:
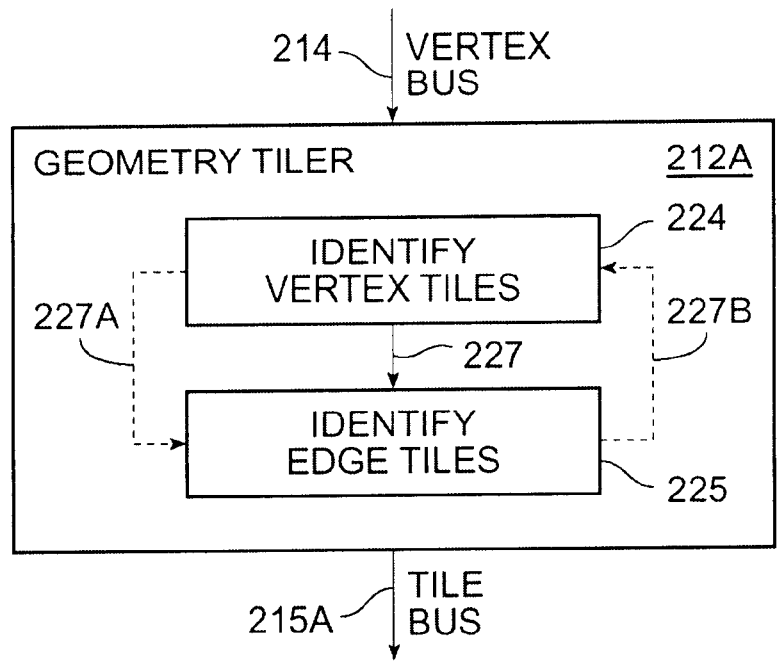
FIGS. 2B and 2C illustrate, in a high-level flow chart and a high-level block diagram respectively, one embodiment of the geometry tiler illustrated in FIG. 2A.

In a first embodiment, geometry tiler 212A (FIG. 2B) identifies (as illustrated by acts 224 and 225) two types of tiles: vertex tiles and edge tiles. A tile is a vertex tile if a vertex of the convex polygon falls within an area enclosed by the tile. A tile is an edge tile if an edge of the convex polygon either passes through the tile or touches the tile (e.g. passes through a common corner of two adjacent tiles).

Figure 2C:
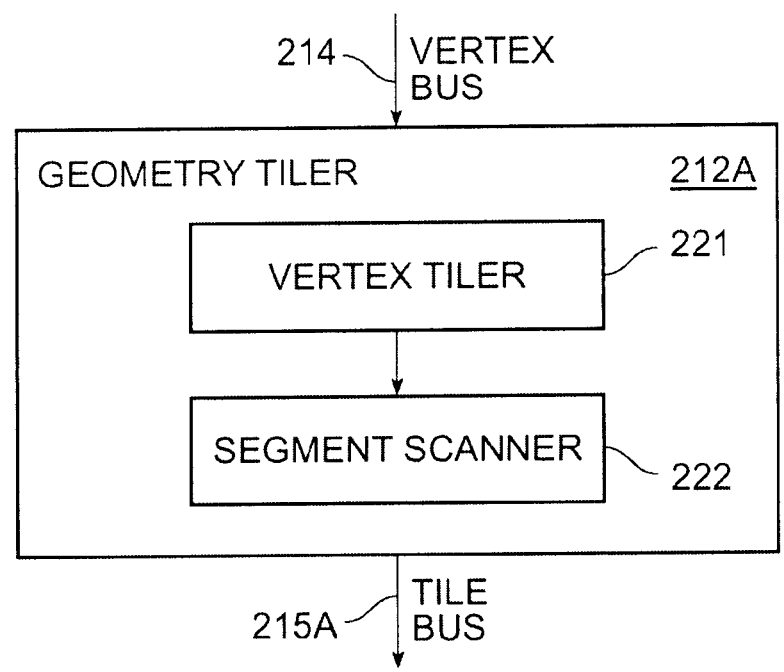
Figure 2D:
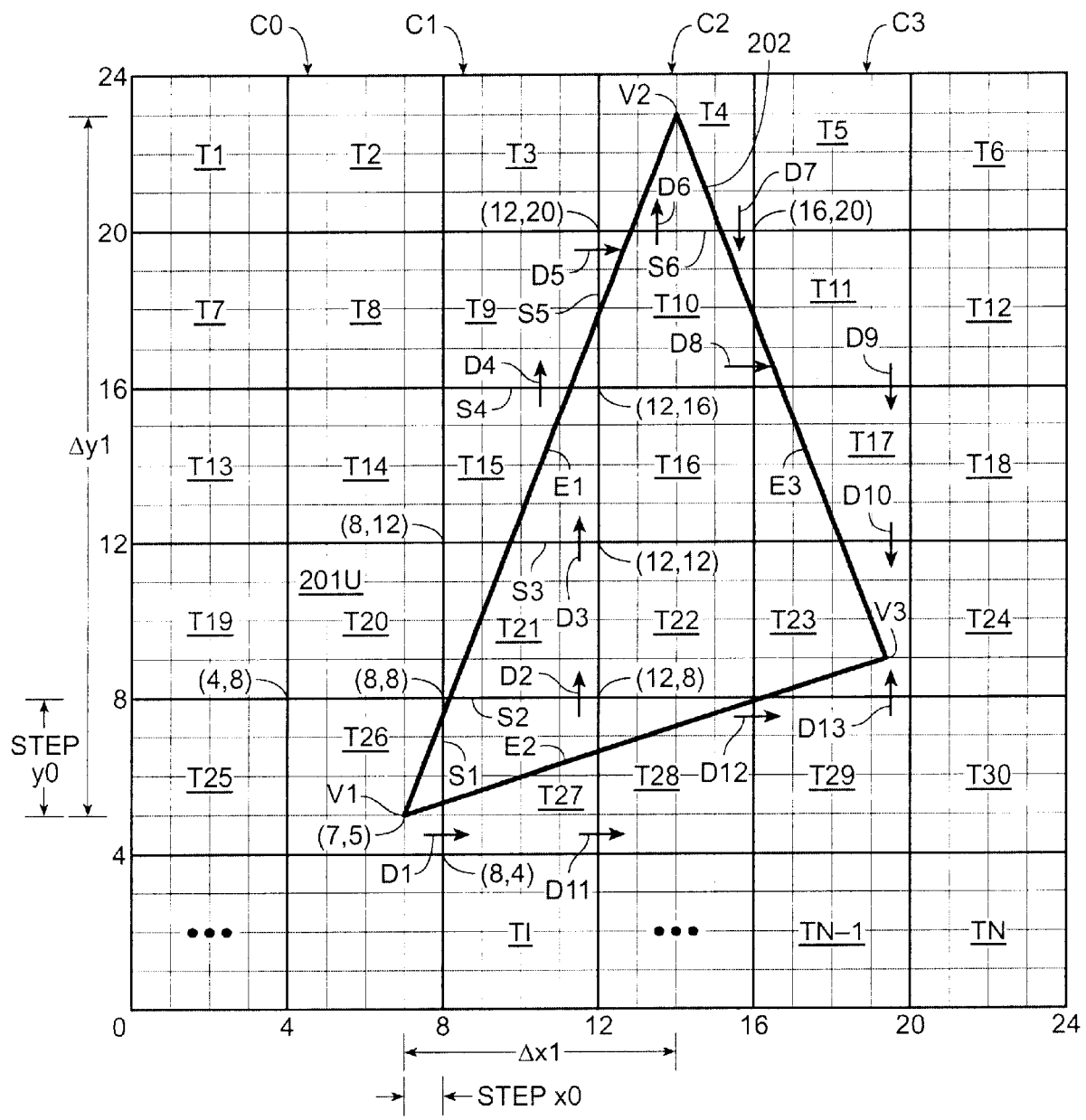
FIG. 2D illustrates tiles on screen 11 illustrated in FIG. 2A, and use of a method of this invention by the geometry tiler of FIG. 2B to identify tiles that are touched by a triangle.

In one implementation, geometry tiler 212A includes a vertex tiler 221 and a segment scanner 222 that operate on a triangle 202 (FIG. 2D), and respectively identify vertex tiles T26, T4 and T23, and edge tiles T27, T21, T15, T9, T10, T11, T17 and T28. As used herein the term "identify" is intended to mean the act of sending a packet (e.g. by driving predetermined signals) on a predetermined bus, wherein the packet uniquely identifies a specific tile, e.g. tile TI. Note that although each of tiles T1–TN illustrated in FIG. 2D is shown as 4 pixels wide and 4 pixels tall, tiles of any other dimensions can be used in accordance with the invention. In one specific implementation, each tile is 32 pixels wide and 32 pixels tall. Note also that the tiles need not have a square shape, e.g. a tile can be 24 pixels wide and 32 pixels tall. Moreover, each tile can have a number of pixels that are different from the number of pixels in another tile, depending on the embodiment.

Vertex tiler 221 can identify vertex tiles after using any technique that identifies a tile covered by a point. For example, vertex tiler 221 may identify a vertex tile after simply dropping a predetermined number of least significant bits (LSBs) of the x and y coordinates of the vertex contained within the vertex tile (e.g. driving on two buses only a predetermined number, e.g. 8 of the most significant bits of each of the two coordinates of a vertex). Similarly, segment scanner 222 can identify edge tiles after using any technique, e.g. after evaluating a line function as discussed below.

Note that although a triangle 202 is illustrated in FIG. 2D, tiles covered by any other convex polygon (such as a rectangle or a quadrilateral) can be identified by the method and geometry tiler described herein. Furthermore, the invention is not limited to convex polygons, and can be used with appropriate modifications for identifying tiles covered by any graphics primitive (such as a line segment or a concave polygon). Moreover, vertex tiler 221 (FIG. 2C) and segment scanner 222 can operate either sequentially or simultaneously, depending on the variant.

In a first variant, geometry tiler 212A operates sequentially by first identifying (see act 224 in FIG. 2B) all vertex tiles T26, T4 and T23, and thereafter identifying (see act 225 in FIG. 2B) edge tiles T21, T15, T9, T10, T11, T17, T28 and T27. Therefore, for each convex polygon (e.g. triangle 202 in FIG. 2D), first variant geometry tiler 212A performs a single transition 227 (FIG. 2B) from act 224 to act 225.

In a second variant, geometry tiler 212A identifies (see act 224 in FIG. 2B) two vertex tiles T26 and T4 first, and thereafter identifies (see act 225 in FIG. 2B) edge tiles T21, T15, T9 and T10 that lie between tiles T26 and T4. Next, second variant geometry tiler 212A returns (via transition 227B) to identifying the next vertex tile T23 (see act 224 in FIG. 2B), and then identifies (see act 225 in FIG. 2B) additional edge tiles T11 and T17 that lie between vertex tiles T4 and T23. Thereafter, second variant geometry tiler 212A identifies (see act 225 in FIG. 2B) additional edge tiles T27 and T28 that lie between vertex tiles T26 and T23. Therefore, for each convex polygon, second variant geometry tiler 212A performs two or more transitions 227A and 227B between acts 224 and 225.

In another variant, geometry tiler 212A identifies edge tiles one column at a time, in a predetermined direction of scanning (e.g. left to right) of columns, e.g. from a column C0 containing the left most vertex V1 to a column C3 containing the right most vertex V3. In this example, geometry tiler 212A first identifies all edge tiles in a column C1 that are covered by edges E1 and E2 (that intersect at vertex V1), e.g. identifies edge tiles T21, T15 and T9 covered by edge E1, and identifies edge tile T27 covered by edge E2.

Next, geometry tiler 212A of this variant identifies edge tiles in an adjacent column C2 to the right that are covered by edges E1 and E2, e.g. edge tiles T10 and T28 covered by the respective edges E1 and E2. When a vertex is reached (e.g. in this case vertex V2 is reached in column C2), geometry tiler 212A identifies tiles covered by the next edge (e.g. edge E3) either same or in the next column. Therefore, geometry tiler 212A identifies, in column C3, tiles T11 and T17 that are covered by edge E3, and tile T29 that is covered by edge E2. Note that instead of columns and a horizontal scanning direction, rows and a vertical scanning direction can be used in other variants.

Identification of tiles 201A–201N (FIG. 2A) in two or more groups (e.g. vertex tiles and edge tiles) in a precise implementation eliminates identification of one or more tiles (hereinafter "untouched" tiles) that are merely located adjacent to a convex polygon (e.g. tile T3 in FIG. 2D located adjacent to triangle 202), but are not covered by the convex polygon. In the example shown in FIG. 2D, untouched tile T2 is normally identified in the prior art when tiles are identified in a single group (en masse), e.g. when using the bounding box method without reference to edges of the convex polygon.

Elimination of the identification of one or more untouched tiles (e.g. tile T3) reduces the time required to process a convex polygon for display on screen 11 as compared to the time required by the prior art (e.g. by the bounding box method). Note that tiles may also be identified in an approximate manner by use of a method or component of the type described herein, without departing from the spirit of the invention.

Figure 2E:
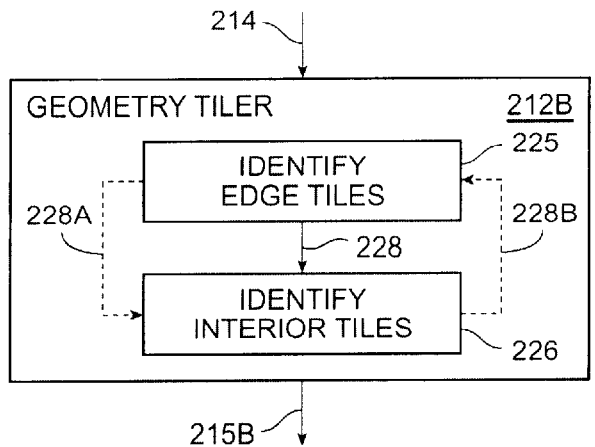
FIGS. 2E and 2F illustrate, in a high-level flow chart and a high-level block diagram respectively, another embodiment of the geometry tiler illustrated in FIG. 2A.

In a second embodiment, a geometry tiler 212B (FIG. 2E) identifies at least the following two groups of tiles: identifies above-described edge tiles (e.g. tiles T27, T21, T15, T9, T10, T11, T17, T28 and T29), and in addition identifies interior tiles (e.g. tiles T16 and T22). Identifications of edge tiles and interior tiles can also be performed in different orders depending on the variant. Specifically, in a third variant, geometry tiler 212B identifies all edge tiles T27, T21, T15, T9, T10, T11, T17, T28 and T29 first. So, third variant geometry tiler 212B identifies interior tiles T16 and T22 only after identification of all edge tiles.

In a fourth variant, geometry tiler 212B first identifies all edge tiles (e.g. tiles T27, T21, T5 and T9) in a column (e.g. column C1), and thereafter identifies the highest and lowest edge tiles (in this example tiles T9 and T27). Next, geometry tiler 212B identifies interior tiles (none in this example because the "in-between" tiles T15 and T21 are edge tiles) that are located in the column between the highest and lowest edge tiles. Next, fourth variant geometry tiler 212B identifies two additional edge tiles (e.g. tiles T10 and T28) in the next column (e.g. column C2), either simultaneous with or subsequent to identification of the just-described interior tiles. Fourth variant geometry tiler 212B identifies, in column C2, the tiles T22 and T16 as interior tiles.

Figure 2F:
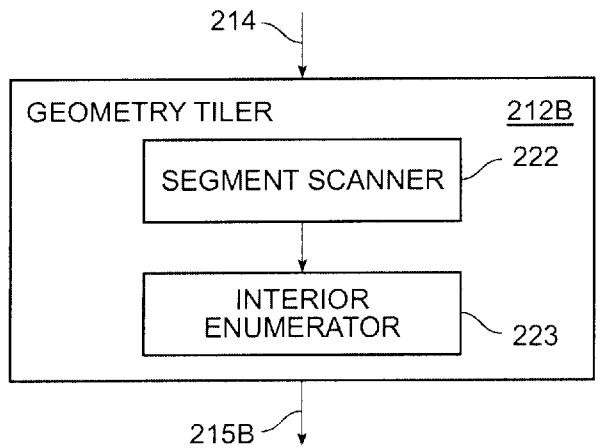

In this manner, fourth embodiment geometry tiler 212B interleaves the identification of interior tiles with identification of edge tiles, thereby to achieve efficiency and avoid storage space. In one implementation of the second embodiment, geometry tiler 212B (FIG. 2F) includes the above-described segment scanner 222 and an interior enumerator 223 that identifies interior tiles.

In a third embodiment, geometry tiler 212C (FIG. 2G) identifies three groups of tiles: vertex tiles, edge tiles and interior tiles. In this embodiment as well, identification of the three groups of tiles can be performed by starting with vertex tiles and thereafter identifying the edge tiles and interior tiles, depending on the variant. In a fifth variant, geometry tiler 212C first identifies (see act 224 in FIG. 2G) all vertex tiles T26, T4 and T23, and thereafter identifies (see act 225 in FIG. 2G) edge tiles T27, T21, T15, T9, T10, T11, T17, T28, and T29, and thereafter identifies all interior tiles (e.g. tiles T16 and T22). In one implementation of the third embodiment, geometry tiler 212C (FIG. 2H) includes each of the above-described vertex tiler 221, segment scanner 222 and interior enumerator 223.

Figure 3A:
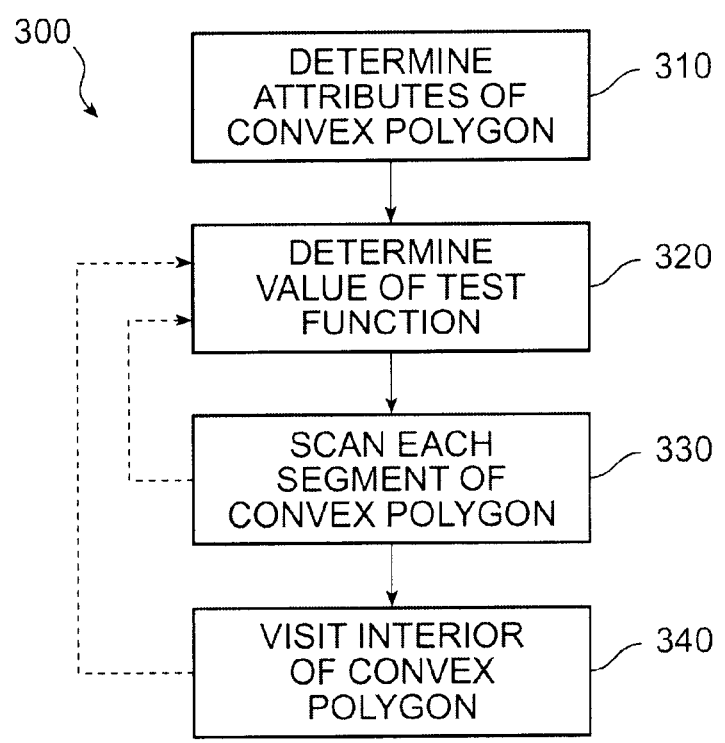
FIGS. 3A, 3B and 3C illustrate, in a high-level flow chart, an intermediate-level flow chart, and a low-level flow chart respectively, operations performed in one embodiment of the geometry tiler.

Third embodiment geometry tiler 212C performs a method 300 (FIG. 3A) and identifies only the tiles 201A–201N (FIG. 2A) that are covered by convex polygon 202. Specifically, geometry tiler 212C (a) determines (see operation 310 in FIG. 3A) attributes of a convex polygon, (b) determines (see operation 320 in FIG. 3A) value of a test function for at least one segment by using the attributes, (c) scans each segment in the convex polygon (see operation 330 in FIG. 3A) and identifies each edge tile that is covered by the segment, and (d) visits (see operation 340 in FIG. 3A) the interior of the convex polygon to ensure that all interior tiles are identified. Note that operations 330 and 340 can be performed in any order. In one implementation, operations 330 and 340 are performed sequentially, wherein operation 330 is first performed, and all edge tiles are identified, and thereafter operation 340 is performed, and all interior tiles are identified. In another implementation, operations 330 and 340 are interleaved to allow the following acts to occur simultaneously: identification of interior tiles that are located between one pair of edge tiles (in operation 340), and identification of an adjacent pair of edge tiles (in operation 330).

Geometry tiler 212C uses act 330 in method 300 to ensure that only tiles that are covered by or touched by a convex polygon are identified. Such selective identification eliminates a significant number (up to half in some cases) of untouched tiles that are otherwise identified by a prior art method (such as the bounding box method). The elimination of identification of up to half the tiles significantly reduces (e.g. reduces to half) the time required by a prior art method and circuit to further process the binned tiles for display of the convex polygon. Moreover, elimination of the identification of untouched tiles also significantly reduces the number of storage locations otherwise required to hold the identities of the binned tiles.

Figure 3B:
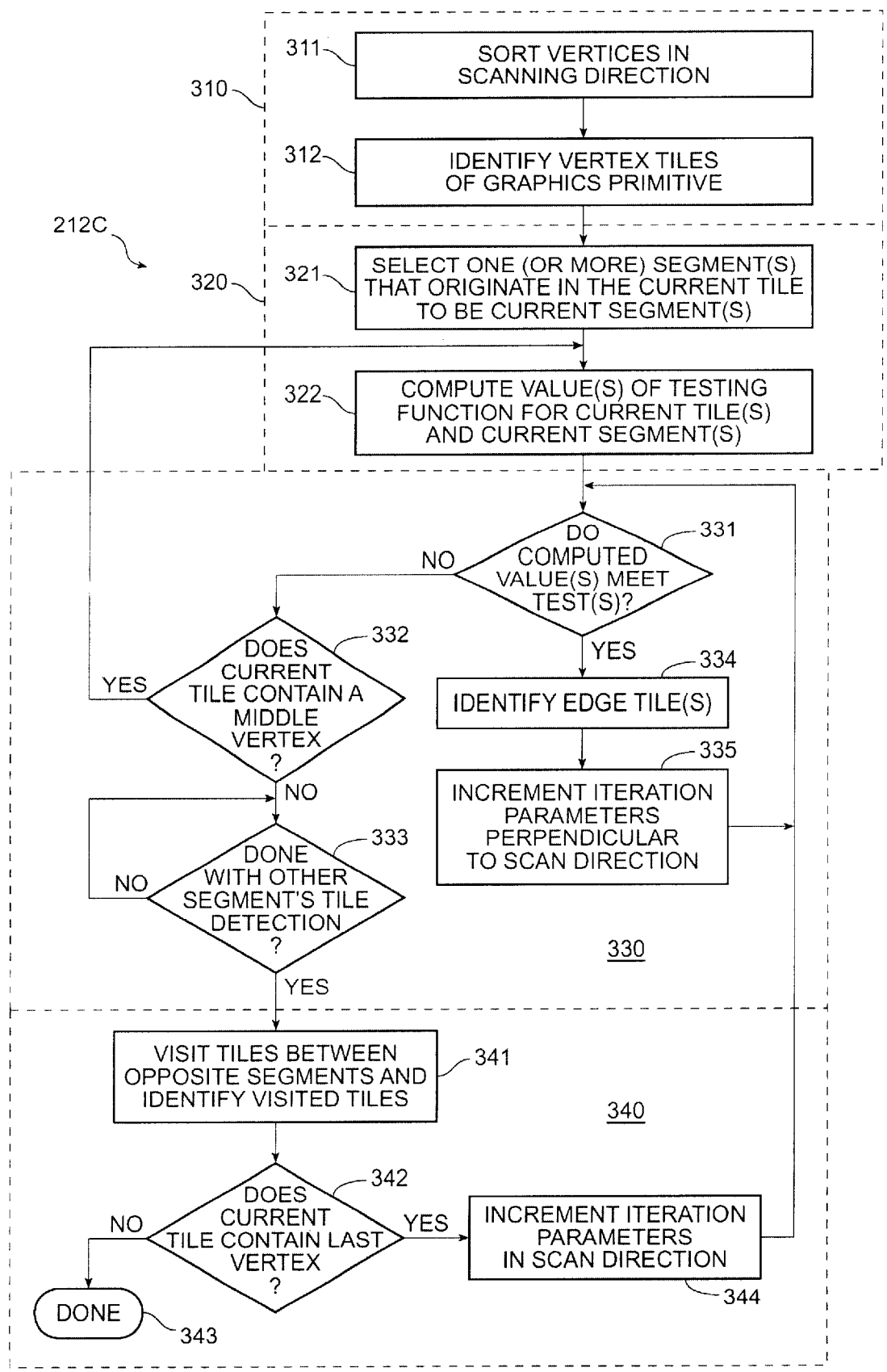
Figure 3C:
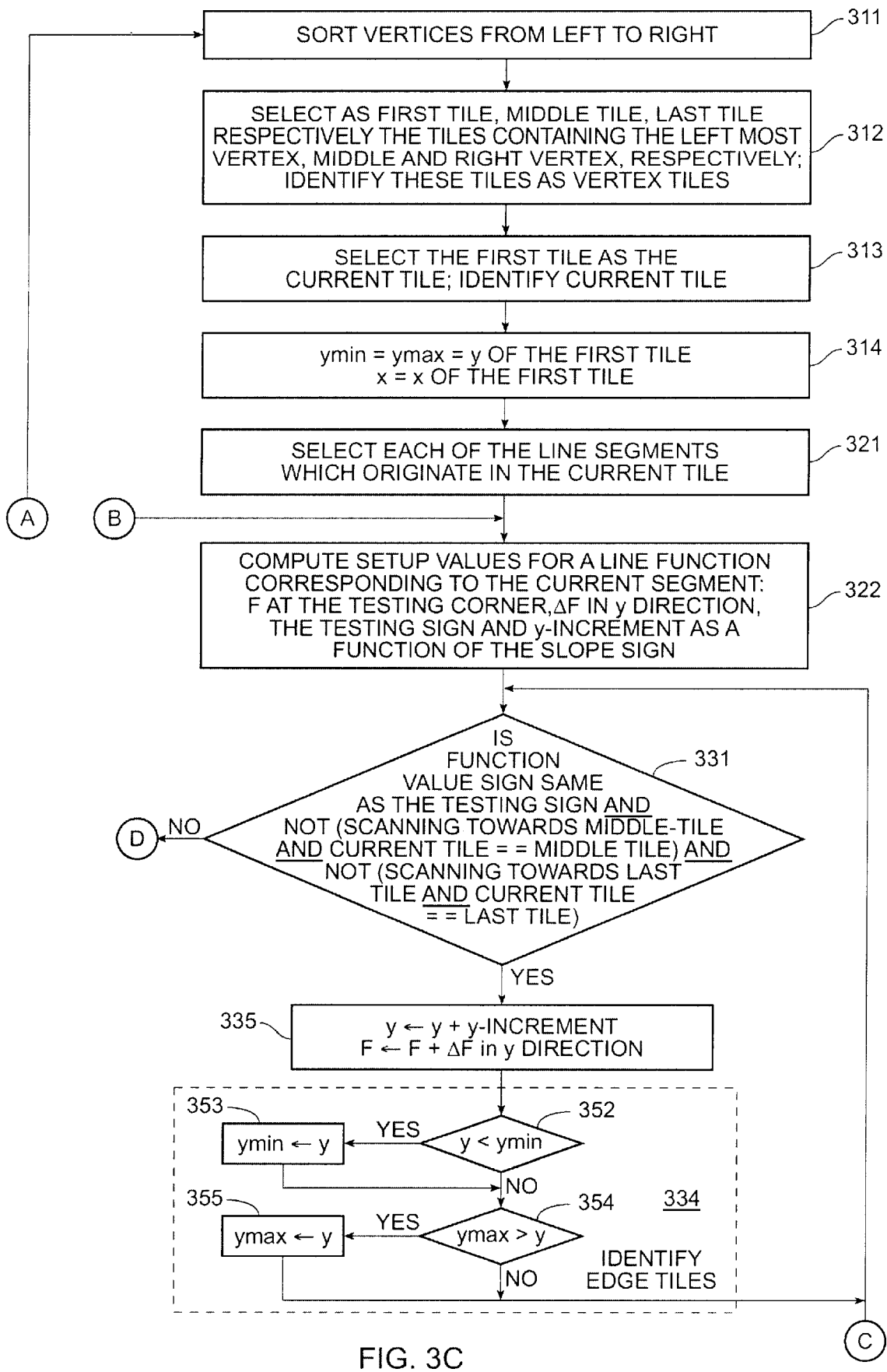
Figure 3C:
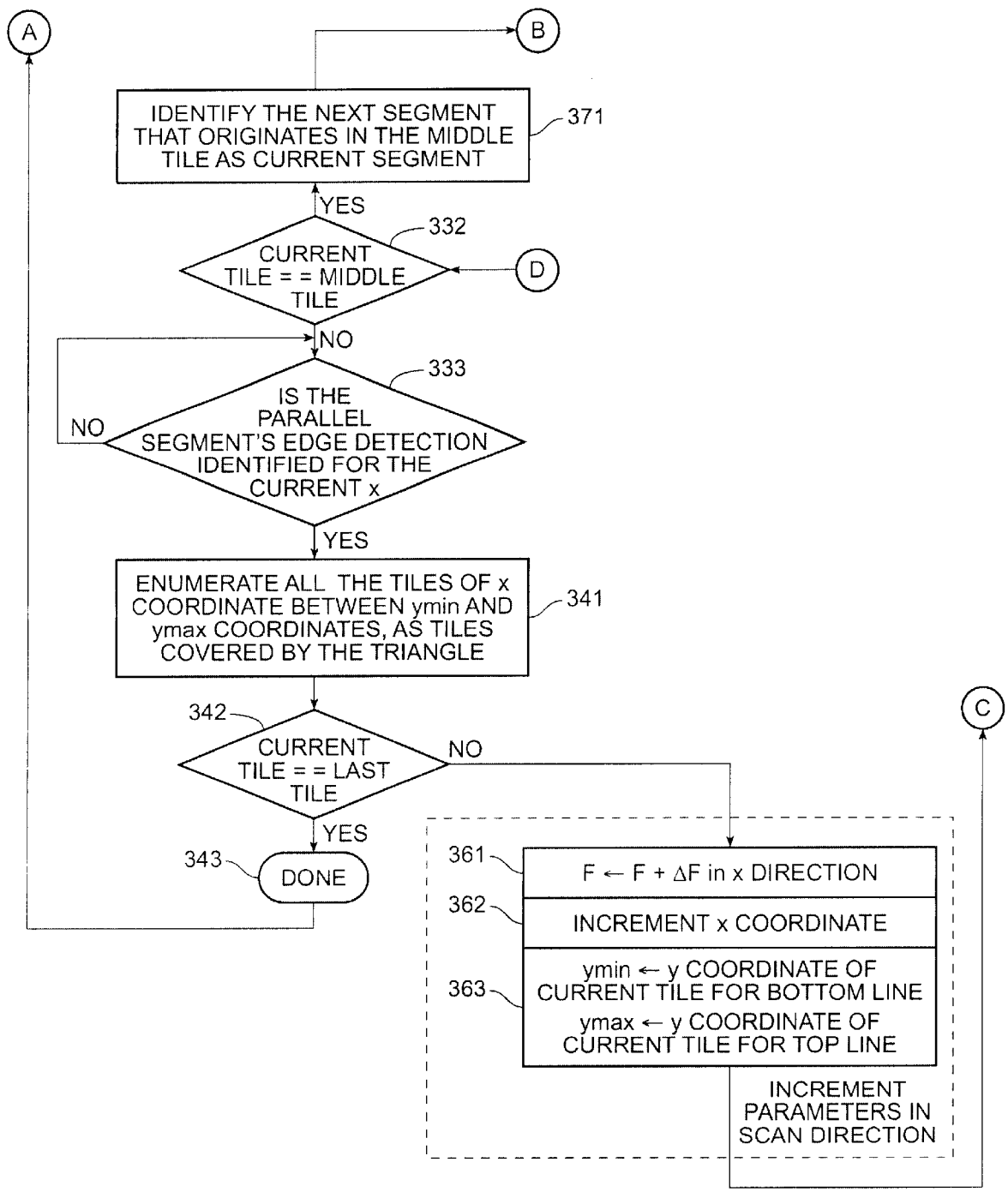

In operation 310 (FIG. 3A), geometry tiler 212C sorts (see act 311 in FIG. 3B) vertices of a convex polygon in a predetermined direction of scanning (e.g. left to right), and identifies (see act 312 in FIG. 3B) tiles that cover the vertices of a polygon that is being binned. In one implementation of this variant, geometry tiler 212C (FIG. 3A) operates only on triangles and performs the method illustrated in FIG. 3C, and is referred to in microfiche Appendix A as a "triangle binner." In the following description, acts performed by geometry tiler 212C (FIG. 3B) are illustrated by but are not limited to corresponding acts performed by triangle binner (FIG. 3C).

The triangle binner first sorts (see act 311 in FIG. 3C) vertices of the triangle from left to right, selects (see act 312 in FIG. 3C) as the first tile, middle tile, and last tile respectively the tiles that contain the left-most vertex, the middle vertex and the right-most vertex respectively, and identifies the selected tiles as vertex tiles. In this implementation, the triangle binner then selects (see act 313 in FIG. 3C) the first tile as the current tile. Sorting of a convex polygon's vertices as described herein eliminates the need to check tiles that are located outside the projection distance of the convex polygon in the scanning direction. In the just-described example, when the scanning direction is from left to right, the sorting eliminates the need to check tiles that are to the left of left most vertex tile, and tiles that are to the right of the right most vertex tile.

In operation 310 (FIG. 3B), the triangle binner also initializes (see act 314 in FIG. 3C) certain variables (namely ymin and ymax that represent limits on tiles in the interior of the polygon are set to the y coordinate of the first tile, and x that represents the x coordinate of the current tile is set to the x coordinate of the first tile). Moreover, in operation 310 (FIG. 3A), the triangle binner may also compute one or more attributes (such as slope) of the line segments that form edges of the triangle.

Next, in operation 320, geometry tiler 212C (FIG. 3B) selects (see act 321) a segment that originates in the current tile to be the current segment, and thereafter computes (see act 322) a value of the testing function for the current tile. Two segments normally originate in a vertex tile, and therefore there can be two current segments. Depending on the implementation, acts 321 and 322 can be performed for the two current segments either sequentially (i.e. both acts 321 and 322 for one segment, followed by both acts 321 and 322 for the other segment), or simultaneously.

Operation 330 (FIG. 3A) can be implemented in any manner to scan each line segment of a convex polygon. In one embodiment, geometry tiler 212C implements operation 330 by performing acts 331–335 (FIG. 3B). Specifically, geometry tiler 212C checks (in act 331) whether a value of the test function computed in act 322 (described above) satisfies a test condition that indicates the current tile is not an edge tile and scanning of the current line segment is not completed.

One such test condition (see act 331 in FIG. 3C) includes checking whether the current tile covers a middle vertex or a last vertex when scanning towards these vertices respectively. Specifically, the triangle binner (FIG. 3C) checks (see act 331) if each of the following is true: (1) a specific side of a current tile is not covered by the current line segment (e.g. by checking if the value of the line function has the same sign as the testing sign, both positive or both negative), and (2) scanning of the current line segment is not completed (e.g. by checking if the following conditions are true: not (scanning towards the middle vertex and the current tile is the middle tile) and not (scanning towards the last tile and current tile is last tile)).

If the condition tested in act 331 (FIG. 3B) is satisfied, geometry tiler 212C goes to act 334 (FIG. 3B) and identifies the current tile to be an edge tile, and also increments the iteration parameters (perpendicular to the scan direction) as illustrated by act 335. In the just-described example, the triangle binner (FIG. 3C) determines that tile T26 (FIG. 2D) is not a middle vertex tile (tile T4 is the middle vertex tile). As these conditions are not satisfied, the triangle binner (FIG. 3C) does not identify current tile T26 to be an edge tile, and thereafter returns to act 331 (described above).

In the just-described example, when the conditions are satisfied in act 331, the triangle binner changes the y coordinate of a current tile (as illustrated by act 335 in FIG. 3C, e.g. changes from tile T27 in FIG. 2D to vertically adjacent tile T21). Thereafter, as illustrated by acts 352–355 (FIG. 3C), the triangle binner resets the limits ymin and ymax to be equal to the y coordinate if the y coordinate is lower than ymin or greater than ymax respectively (thereby to identify two edge tiles in a column). At this time, the triangle binner also resets the value of the test function. Note that although various acts are illustrated in FIG. 3C as being performed in a specific order, one or more such acts can be performed in a different order. For example, in FIG. 3C the acts 334 and 335 are performed in an order reverse of the order illustrated in FIG. 3B.

In the example illustrated in FIG. 2D, geometry tiler 212C checks if side S1 of current tile T26 is covered by current line segment E1 (that forms an edge of triangle 202). Tile T26 was set to be the current tile in an earlier operation, e.g. in operation 320 (FIG. 3B). Next, geometry tiler 212C again determines (see acts 322 and 331) a covered side (e.g. side S2 of tile T27 in FIG. 2D as being covered by segment E1) in this iteration, and selects (see act 335 in FIG. 3C) another tile (e.g. tile T21) to be the current tile. So, in this example, geometry tiler 212C iterates while selecting a number of tiles (in act 335) that are covered by line segment E1 (FIG. 2D) and that lie between end points V1 and V2 of segment E1. To summarize, geometry tiler 212C starts with vertex tile T2 and identifies in x direction the tiles T27, T21, T15, T9, T10 and T4 to be edge tiles, and in the process determines the respective sides S1–S6 to be covered by segment E1 (FIG. 2D).

If the test condition is not satisfied in act 331 (FIG. 3B), geometry tiler 212C checks in act 332 whether the current tile contains the middle vertex (e.g. tile T4 is a middle vertex tile), and if so, returns to act 322 via act 371. In act 371, geometry tiler 212C switches from current segment E1 to current segment E3, because segment E3 has an endpoint in current tile T4. If the current tile is not a middle tile, geometry tiler 212C checks in act 333 (FIG. 3B) if the other current segment's scanning is completed, and if not completed waits for completion. When scanning of both current segments is completed, geometry tiler 212C performs operation 340 (described herein in reference to FIG. 3B).

In the example, when the current tile (e.g. tile T4) is covered by an end point (e.g. vertex V2) of the current segment (e.g. segment E1), geometry tiler 212C goes from act 331 to act 332 (FIG. 3C) and checks if the current tile is the middle tile determined in act 312 (described above). If so, geometry tiler 212C returns to act 322. As noted above, the current segment is reset in act 371 (FIG. 3D) to the next segment (e.g. segment E3 in FIG. 2D). If not true, then geometry tiler 212C checks if the current tile is the last tile and also checks for completion of scanning of the other line segment (segment E2 in this example). If scanning of the other line segment is to be done sequentially, then geometry tiler 212C initiates scanning of segment E2 at this time. Alternatively, if two segments are being scanned simultaneously, geometry tiler 212C simply waits until scanning of segment E2 is completed.

Note that acts 331 and 332 can be changed (generalized to handle a convex polygon other than a triangle) by going towards the next vertex, and checking if the current tile contains the next vertex (if any more line segments need to be scanned as may be the case when the convex polygon has more than three line segments, e.g. a quadrilateral). Performance of such an optional act may be made conditional on the type of convex polygon, e.g. the optional act may not be performed when the graphics primitive is a triangle. In case of a graphics primitive having more than three line segments, if only one line segment is remaining, geometry tiler 212C continues to act 332 as described herein, and otherwise scans any other line segments in a similar manner.

In one implementation of operation 322 (FIG. 3B), the triangle binner computes the slope of each line segment E1–E3. In another implementation, instead of computing the slope, the triangle binner computes (as illustrated by act 370 in FIG. 3D) each segment's projection distances along two axes: $\Delta x$ along the x axis, and $\Delta y$ along the y axis. As used herein, "projection distance" is the distance obtained by projection of a line segment along a specified axis. The projection distances can be used to determine the direction of the current line segment relative to the current tile as described below. Although this implementation uses left to right as the direction of scanning, in other implementations, scanning is performed in other directions, such as right to left, top to bottom, and bottom to top.

In this implementation, the triangle binner uses as the test function an explicit representation of a line that passes through the current line segment. Specifically, the triangle binner uses the line function $F(x,y)=ax+by+c$ that is based on Cartesian coordinates (x,y) and on the implicit representation $y=mx+n$ (wherein m is the slope and n is the y intercept at x=0) of a line that passes through the current segment. Line function $F(x,y)$ has a value that is equal to zero when a point (x,y) is on the line, and the value is positive when the point is on one side of the line and negative on another side of the line. Preferably, but not necessarily, function $F(x,y)$ may be defined to have a positive value for all points in the interior of the convex polygon and a negative value outside the polygon. Note that instead of line function $F(x,y)$ described herein, any approximations of this function (e.g. by adding/subtracting a constant (such as 0.5) to the formula) can be used in other embodiments of a triangle binner.

The above-described line function $F(x,y)$ can be written as $Fnew=Fold+\Delta y*stepx-\Delta x*stepy$, wherein $\Delta x$ and $\Delta y$ are projection distances, stepx is the distance along the x axis of a new position from an old position, stepy is the distance along the y axis of the new position from the old position, and Fold is a value of the line function at the old position. An old position can be, for example, a left most vertex, with Fold set to zero (by definition) at the left most vertex. In this implementation, the triangle binner computes (see act 370 in FIG. 3D) a first projection distance $\Delta x$ as the difference between the x coordinates of the end points of a current segment, and also computes (see act 370 in FIG. 3D) a second projection distance $\Delta y$ as the difference between the y coordinates of the end points of the current segment. In the example illustrated in FIG. 2D, the triangle binner computes the x and y projection distances of segment E1 to be $\Delta x1=7$ and $\Delta y1=18$ respectively.

Note that instead of computing and using exact values of distances $\Delta x$ and $\Delta y$, approximate values are computed and used in an alternative embodiment. In one example of the alternative embodiment, a top segment (not shown) slopes upwards and to the right, from a first vertex tile to a second vertex tile, and distances $\Delta x$ and $\Delta y$ are set to the differences in x and y coordinates of the upper left corners of the first vertex tile and the second vertex tile (because the area enclosed by the polygon is below the top segment). This alternative embodiment may result in identification of additional tiles that are approximately the same in number as the number of edge tiles (e.g. up to two additional tiles per column, each additional tile being adjacent to an edge tile).

In one embodiment, the partial products $\Delta y*stepx$ and $\Delta x*stepy$ (used to compute Fnew) are determined by merely shifting the respective values of $\Delta y$ and $\Delta x$ because each of stepx and stepy are power of 2 (e.g. 32). Moreover, the partial products are determined just once in act 370 (FIG. 3D), and the same partial products are used to determine a testing corner. Specifically, in this particular implementation, the triangle binner computes a value (see act 375 in FIG. 3D) of function F(x,y) at a single corner of the current tile, and uses the projection distances (described above) to select the corner to be used in the evaluation. If both projection distances Δx and Δy are positive (or the slope is positive) the triangle binner selects the upper right corner as the corner to be used, because the current segment slopes upwards and to the right. In the example of FIG. 2D, as line segment E1 extends from the current tile T26 upwards and to the right (as determined from Δx and Δy having positive signs), the triangle binner uses the line function's value at the upper right corner (also called "testing corner") of the current tile to determine whether line segment E1 passes through the upper side of the tile or the right side of the tile.

In the example of FIG. 2D, the triangle binner computes the value Fnew of the function of line segment E1 at a corner point (8,8), based on value Fold of the line function being zero at vertex V1. In the example, stepx0 is the distance in the x direction between corner point (8,8) and vertex point (7,5), and is computed to be 1. Similarly, stepy0 is the distance in the y direction between corner point (8,8) and vertex point (7,5), and is computed to be 3. Therefore, the triangle binner computes value of the line function at point (8,8) as F(8,8)=F(7,5)+18*1−7*3. F(8,8)=−3, because F(7, 5) is zero.

The triangle binner uses the initial value −3 of the line function to check (see act 331 in FIG. 3C) whether the value has the same sign as the testing sign. If so, the triangle binner determines that a upper side of current tile T26 is covered by current line segment El. In the example, initial value −3 is negative, and therefore the triangle binner determines that the right side S1 of tile T26 is a covered side. Note that the triangle binner of this embodiment determines a right side to be the covered side even when the function F(x,y) has a zero value at the testing corner, thereby to visit a tile on the right (e.g. moves in direction D12 from tile T28 to tile T29) even though the visited tile (e.g. tile T29) is merely touched).

In the just-described implementation, the triangle binner tests the value of the line function at a single corner, i.e. F(8,8). In another implementation, the triangle binner tests the value of the line function at three corners, e.g. checks whether the value F(4,8) is same sign as value F(8,8) in which case the upper side of tile T26 is not covered by a side of the triangle. The triangle binner of this implementation also checks whether value F(8,8) has the same sign as F(8,4), and if not then right side S1 of tile T26 is a covered side. Note that the triangle binner can determine the corners of the tile at which the evaluated function has different signs, and identify the side passing through these corners to be the tile's side covered by the edge. The edge covers the tile's side that passes through corners at which the evaluated function has different signs. Therefore, the triangle binner can determine the covered side of a tile in any number of ways.

After determining covered side S1 (FIG. 2D), the triangle binner increments (in act 362 in FIG. 3C) the x coordinate of the current tile by selecting passage of the x increment to an adder. Therefore, in the just-described implementation, the triangle binner selects a tile (tile T27 in the example) that is adjacent to the covered (side S1 in the example) to be the current tile (for the top line segment E1). The triangle binner also resets ymin and ymax (that represent the y coordinates of edge tiles in the previous column) to be the y coordinate (in the current column) of the two current tiles that are covered by the bottom line segment and the top line segment respectively (e.g. edges E1 and E2 in FIG. 2D).

Next, the triangle binner checks (in act 332 in FIG. 3C) if the current tile (e.g. tile T27) is a middle vertex tile, e.g. is covered by another end point (e.g. vertex V2) of the current segment (e.g. segment E1). In the example, as current tile T27 is not covered by the other end point V2 of line segment E1, the triangle binner checks (see act 342 in FIG. 3C) if the current tile is last vertex tile V3, and if not identifies the current tile (e.g. tile T27 in FIG. 2D) to be an edge tile (see act 334 in FIG. 3C). To summarize, the triangle binner performs the acts 331–333, 341–343 and 361–363. If the current tile is a last vertex tile, the triangle binner waits for the other segment's edge tiles to be identified (in act 333).

After returning to act 331, the triangle binner again checks the sign of the line function's value at the testing corner to find a covered side (e.g. side S2 of tile T27 in FIG. 2D as being covered by segment E1) in this iteration. Specifically, in the example, the triangle binner computes (in act 375 in FIG. 3D) the value F(12,8)=−3+18*4=69. Note that stepy is zero at this point because the triangle binner moves in direction D1 that is horizontal, when replacing tile T26 with tile T27 as the current tile. As the value 69 is positive, the triangle binner determines upper side S2 (FIG. 2D) as being the covered side of tile T27, and selects tile T21 to be the current tile.

In the example, as current tile T21 is not covered by the other end point V2 of line segment E1, the triangle binner identifies (in act 334 in FIG. 3C) tile T21 as an edge tile. Next, the triangle binner determines tile T21's side that is covered by line segment E1 by computing (see act 375 in FIG. 3D) the value F(12,12)=69−28=41. Note that stepx is zero at this point because the triangle binner moves in direction D2 that is vertical, when replacing tile T27 with tile T21 as the current tile. As value 41 is positive, the triangle binner again determines the upper side S3 as being covered by segment E1, and moves in the upward direction (direction D3).

The direction in which the triangle binner moves is determined as shown in the following table based on whether the current segment is a top segment or bottom segment and whether the current segment has a positive or negative slope, and the sign of the evaluated function, assuming (1) that the scanning direction is from left to right and (2) that the function's value is defined to be positive in the interior of the triangle. A current line segment is a top segment if another segment of the convex polygon is located below the current line segment, and a bottom segment if another segment is located above the current line segment.

| Current Segment | Slope | F(x,y) | Direction of travel |
| --- | --- | --- | --- |
| top segment | positive | positive | up |
| top segment | positive | negative | right |
| top segment | negative | positive | right |
| top segment | negative | negative | down |
| bottom segment | positive | positive | right |
| bottom segment | positive | negative | up |
| bottom segment | negative | positive | down |
| bottom segment | negative | negative | right |

In one implementation, the triangle binner determines the function as F(x,y)=0=Ax+By+C, wherein A=Δy=y2−y1 and B=−Δx=−(x2−x1)=x1−x2 and C=(Δx)(y)−(Δy)(x), and F(x, y)>0 below the line segment, and F(x,y)<0 above the line segment, assuming a horizontal scanning direction from left to right.

Whenever the triangle binner moves the current tile in a direction perpendicular to the scanning direction, the triangle binner updates (e.g. see act 335 in FIG. 3B) identifiers of edge tiles in that direction. For example, the triangle binner updates the y coordinate of the lowest and highest tiles (that are edge tiles) in a column if the scanning direction is horizontal in this example. Moreover, one implementation of the triangle binner also visits and identifies all tiles in a column (e.g. see act 341 in FIG. 3B) when moving to a tile in the horizontal direction, and thereafter updates the appropriate parameters in the scanning direction (e.g. see act 344 in FIG. 3B).

In additional iterations, the triangle binner computes values F(12, 16), F(12,20) and F(16, 20), determines respective sides S4–S6 (FIG. 2D) as being covered sides, and moves in directions D4–D6 until reaching vertex tile T4 that contains vertex V2. When a current tile, such as vertex tile T4 is covered by the other end point, vertex V2 of line segment E1, the triangle binner selects the remaining line segment E3 to be the current segment, and determines attributes and descriptors for segment E3.

In the example, as segment E3 has a negative slope, the triangle binner determines (in act 377 in FIG. 3D) the bottom right corner to be a testing corner, computes (in act 375) the value of line function for segment E3 at point (16, 20), and determines (in act 331 in FIG. 3C) side S6 to be a covered side of tile T4. Thereafter, the triangle binner sets adjacent tile T10 (see FIG. 2D) to be current tile, and computes the value of line function at corner (16,16). Therefore, the triangle binner moves from vertex V1 (FIG. 2D) to vertex V2 while identifying edge tiles T26, T27, T21, T15, T9, T10 and T4 (note that T26, T23 and T4 are vertex tiles that are not identified in operation 330; they were previously identified in act 312). The triangle binner thereafter moves from vertex V2 to vertex V3 while identifying edge tiles T10, T11 and T17 covered by line segment E3.

Figure 4A:
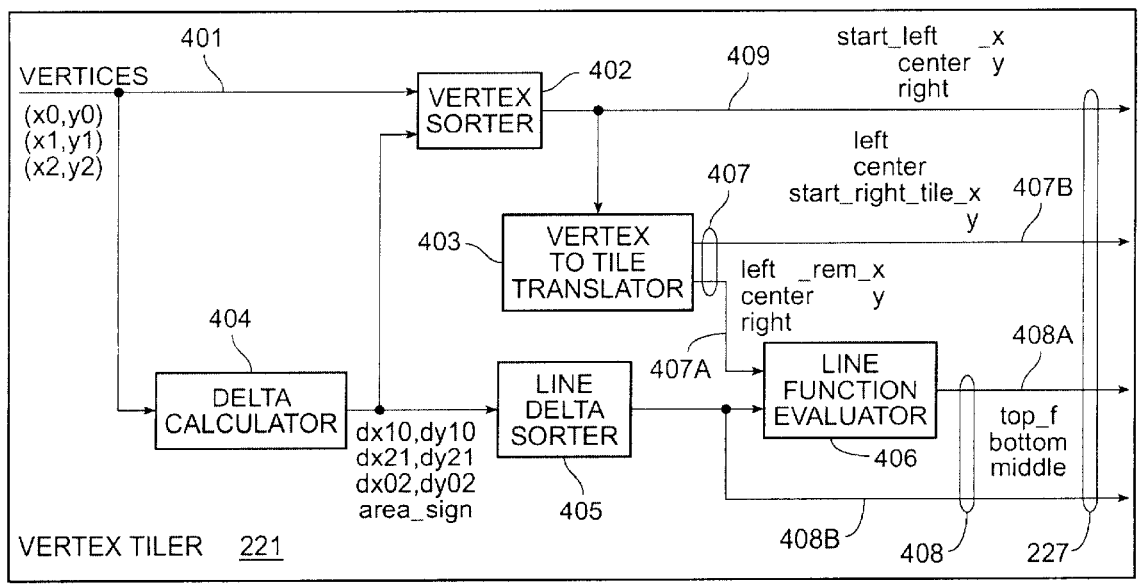
FIGS. 4A–4G illustrate, in block diagrams, circuitry for implementing the flow chart illustrated in FIG. 3C.

Depending on the implementation, the triangle binner can move from vertex V1 to vertex V3 (in directions D11–D13) to identify edge tiles T27, T28 and T29 covered by segment E2 either sequentially or in an interleaved manner with identification of edge tiles covered by edges E1 and E3 as described above. Specifically, in one implementation discussed below in reference to FIGS. 4A–4C, the triangle binner simultaneously identifies edge tiles along a first path between left most vertex V1 (FIG. 2D) and right most vertex V3 (the path being formed by segments E1 and E3), and along a second path also between vertices V1 and V3 (formed by segment E2).

The triangle binner of this implementation moves in the horizontal direction one column at a time, identifying all tiles in each column that are covered by either of the two paths. Note that instead of horizontal movement in operation 330 (FIG. 3B), the triangle binner can move in a vertical direction during operation 330, along two paths between lowest vertex V1 and highest vertex V2, while identifying all tiles in each row that are covered by either of two paths (one path formed by segment E1 and the other path formed by segments E2 and E3). In act 332, if the current tile is a middle vertex tile, the triangle binner selects in act 371 the remaining segment E3 as the current segment, and determines (in act 322 of FIG. 3C) various values for segment E3. Thereafter, the triangle binner goes to act 334 to identify the current tile as an edge tile.

In another implementation, the triangle binner evaluates the line function F(x,y) at three corners of the current tile (such as corners (8,12), (12,12) and (12,8) for tile T21 in FIG. 2D). The corner that is skipped is selected based on the direction of scanning and the direction of the current line segment. For a scanning direction of left to right, if the current segment slopes upwards, then the bottom-left corner of the current tile is skipped, and if the current segment slopes downwards, then the upper-left corner is skipped.

From among the just-described three corners, the triangle binner identifies the two corners at which the evaluated function has different signs, and identifies the side passing through these corners to be the tile's side covered by the edge. Therefore, the edge covers the tile's side that passes through two corners at which the evaluated function has different signs. In other implementations, a triangle binner can perform other acts to determine the value of a test function, or test for other conditions to determine which side of the tile is covered by a line segment of the triangle.

At the beginning of operation 322 (FIG. 3C), the triangle binner also computes (see act 370 in FIG. 3D) values of the step increments, stepx and stepy as the x and y axes projection distances of a diagonal of a tile (e.g. stepx and stepy are both 4, as each tile is 4 pixels wide and 4 pixels tall), because the triangle binner moves in increments of a tile's dimension (in the direction of movement). As noted above, instead of 4, step increments stepx and stepy can each have the value 32, if a tile is 32 pixels wide and 32 pixels tall.

Prior to computing the line function's value, the triangle binner checks (see act 371 in FIG. 3D) if the slope of the current segment, e.g. slope of segment E1, would be positive (e.g. if both $\Delta x$ and $\Delta y$ have positive signs). If so, the triangle binner identifies (see act 372) the upper right corner of the current tile as the testing corner. In the example illustrated in FIG. 2D, distances $\Delta x1$ and $\Delta y1$ are both positive, and the triangle binner selects the upper right corner, a point having coordinates (8,8), to be the testing corner. Next, the triangle binner identifies (see act 373) as an increment for the current line segment, a positive value of a tile's dimension (e.g. the tile's width or height).

The triangle binner also identifies (see act 374) as a testing sign the positive sign for one current line segment that is located above the other current line segment (i.e. when the y coordinate of any point on the current line segment is larger than the y coordinate of another point on the other current line segment). After computing the value of the line function (see act 375 that is described above), the triangle binner checks if the iteration descriptors (such as the line function's value, the increment, the testing sign, and the testing corner) for all segments are determined. If so, the triangle binner has completed all work for operation 322, and otherwise returns to act 370 (described above).

Figure 3D:
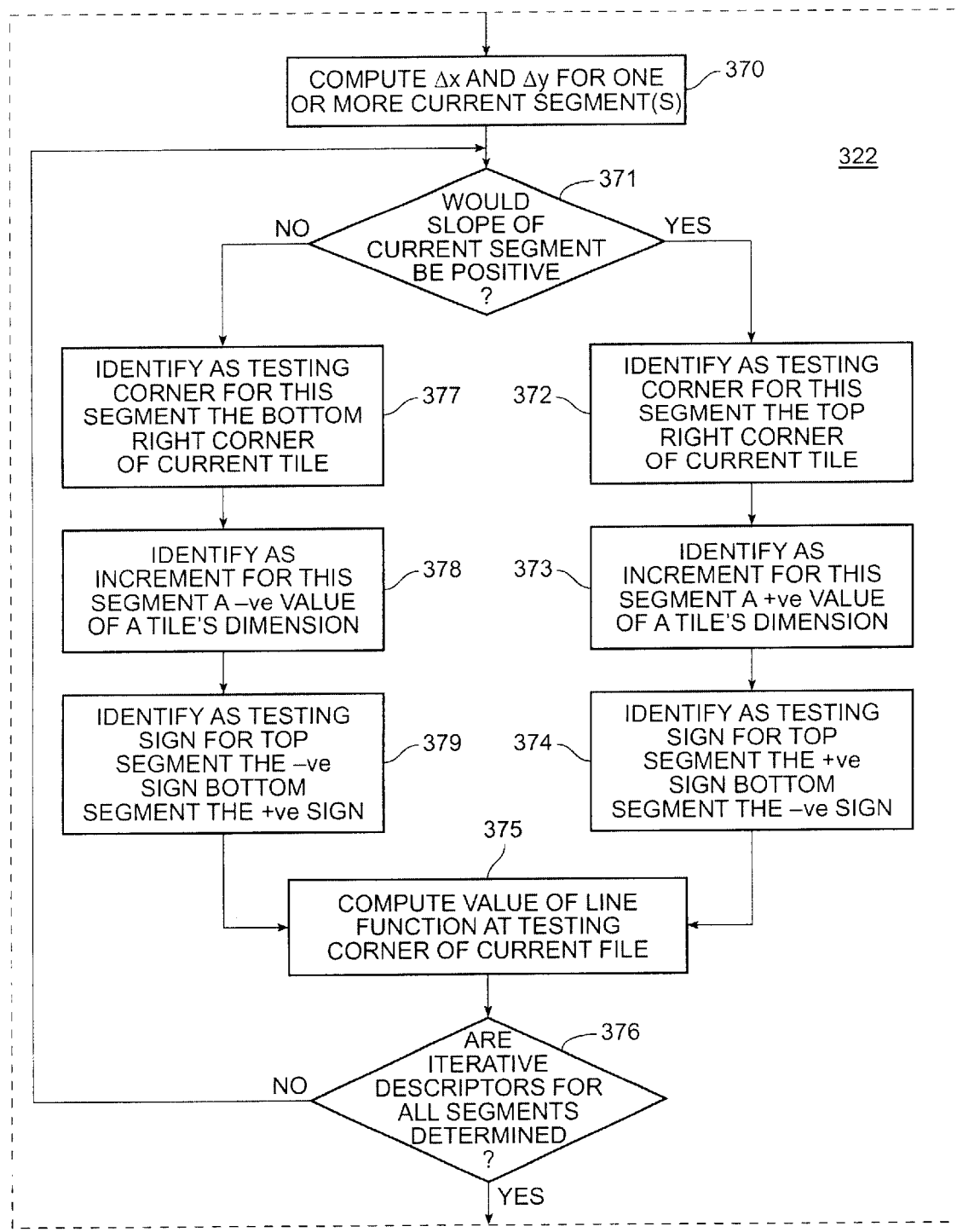
FIG. 3D illustrates, in a low level flow chart, operation 322 illustrated in FIGS. 3B and 3C.

In act 371, if the slope of the current segment would not be positive (i.e. slope would be zero or negative), the triangle binner performs acts 377–379 that are similar to acts 372–374 but refer to "bottom right corner" in act 377, "-ve value" in act 378 and "-ve sign" in act 379, as indicated in FIG. 3D. Depending on the embodiment, acts 371–375 for all segments of a triangle can be performed simultaneously, or sequentially.

Figure 3E:
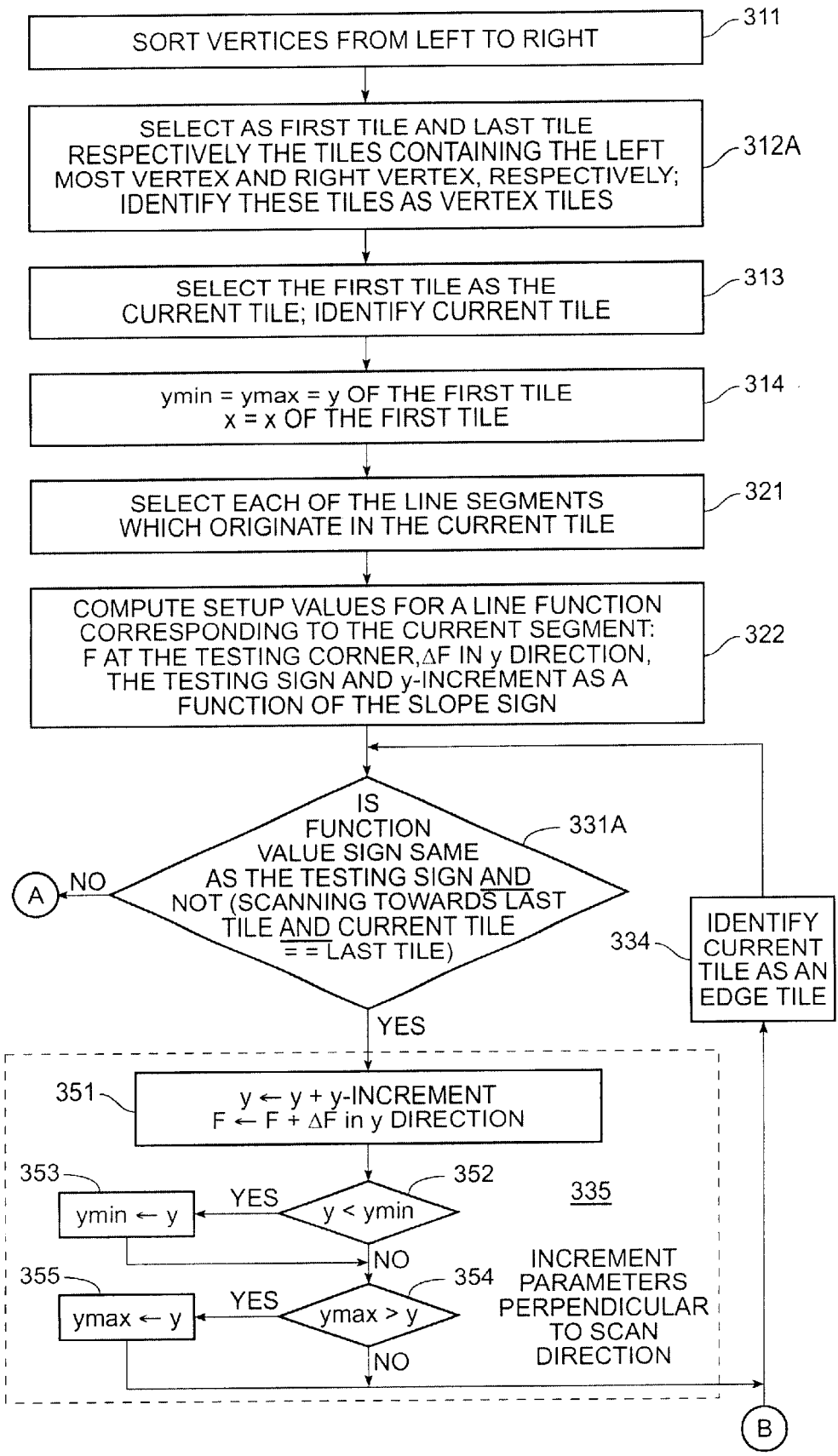
FIG. 3E illustrates, in a low level flow chart, operations performed in another embodiment of the geometry tiler for binning a line segment.
Figure 3E:
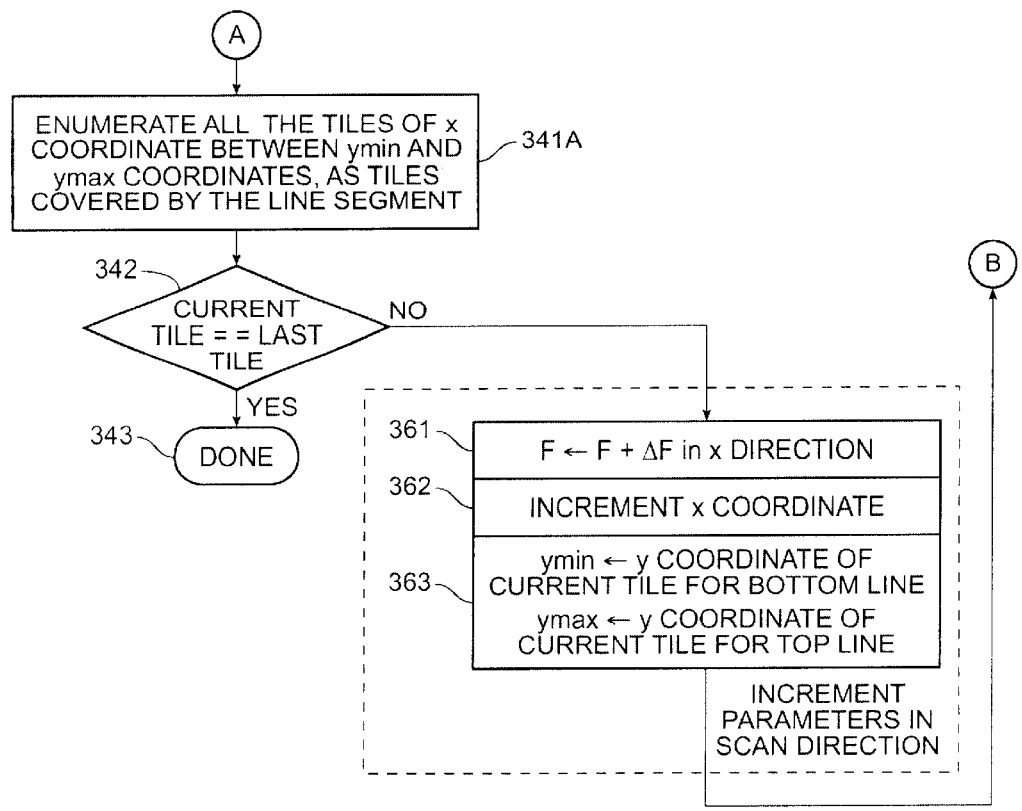

In another embodiment, the binning of a line segment is performed by performing acts illustrated in FIG. 3E that are similar or identical to the acts described above in reference to FIG. 3C (i.e. FIG. 3E is obtained as a degenerate case of FIG. 3C). Specifically, in acts 312A and 331A the middle vertex is not used (as there is no middle vertex for a line segment), and in act 341A the tiles covered by the line segment (rather than the triangle) are enumerated.

In one implementation, the triangle binner of FIG. 3C is implemented by a vertex tiler 221 (FIG. 4A), a segment scanner 222 (FIG. 4B), and an interior enumerator 223 (FIG.

4G) that are similar to the corresponding components described above in reference to FIG. 2H.

Vertex tiler 221 (FIG. 4A) implements operations 310 and 320 (see FIG. 3B), while segment scanner 222 (FIG. 4B) implements operation 330 (see FIG. 3B), and interior enumerator 223 (FIG. 4G) implements operation 340 (see FIG. 3B), thereby to provide one specific implementation of method 300 described above in reference to FIG. 3A. Vertex tiler 221 (FIG. 4A) of this implementation receives via a vertex bus 401 a number of triangles one at a time in the form of three vertices (x0, y0), (x1, y1) and (x2, y2) from a first-in-first-out (abbreviated as "FIFO") memory (hereinafter "vertex FIFO"; not shown in FIG. 4A) that holds the vertices. Note that depending on the type of graphics primitive, vertex bus 401 can have the appropriate width to carry any number of vertices: e.g. two vertices for a line segment primitive, three vertices for a triangle primitive, and four vertices for a quadrilateral primitive, or any number of vertices of a convex polygon.

Vertex tiler 221 includes a delta calculator 404 that receives the vertices from bus 401 and computes the differences (also called "deltas") between the x and y coordinates of the three vertices, for use by a vertex sorter 402 (described below). Delta calculator 404 uses the received vertices to calculate projection distances between vertices, e.g. distances dx10=x1−x0, dx21=x2−x1, and dx02=x0−x2 using the x coordinates, and similar distances using the y coordinates. Delta calculator 404 uses the differences to calculate an indicator (e.g. signal area sign illustrated in FIG. 4A) of the area enclosed in the polygon (e.g. computes a cross product to determine twice the area), and thereafter determines if the vertices were received in clockwise order (i.e. drawing a path starting at (x0, y0), passing through (x1, y1) and ending in (x2, y2) will be in the clockwise direction). Note that in one embodiment, delta calculator 404 also discards triangles that have zero area, as well as triangles that are back facing (i.e. triangles that are not visible) as described in detail in the above-referenced U.S. Patent Application [Attorney Docket No. M-7153].

If the vertices are not in the clockwise order, delta calculator 404 inverts the sign of the differences, and determines which of two paths (starting from the left-most vertex and going from left to right) includes which of the line segments (e.g. for a triangle, a top path may have two line segments, and a bottom path may have one line segment).

Vertex tiler 221 also includes a vertex sorter 402 that receives the vertices from bus 401 and the deltas from delta calculator 404, and sorts the vertices from left to right, thereby to implement act 311 (FIG. 3B). Vertex sorter 402 uses the deltas to determine the order of the three vertices relative to one another. Specifically, if dx10 is positive, x1 is greater than x0, and so x1 is to the right of x0. In this manner, using the deltas in the three x coordinates, sorter 402 determines the order (from left to right) of the three vertices. If a delta is zero (implying the two coordinates have the same x value), then any act can be used to break the tie, e.g. the difference between the y coordinates, or the order of receipt of the vertices.

Vertex tiler 221 also includes a vertex-to-tile translator 403 that receives the three vertices (sorted in the left to right direction) from sorter 402 (via sorted vertices bus 409), and passes to a vertex tiles bus 407B a vertex tiles signal formed by the coordinates of tiles that contain the respective vertices. Therefore, vertex-to-tile translator 403 implements act 312 (FIG. 3B). Specifically, translator 403 performs integer division on the coordinates of vertex (x, y) by the tile height and tile width, and uses the respective quotients as the tile coordinates. The remainders of the division are supplied to a remainder bus 407A and indicate the position of the vertex as offsets from the tile's center (or from the tile's bottom left corner in another embodiment).

Since this implementation uses tile sizes that are powers of 2, the quotient is simply a predetermined number of most significant bits (MSBs) of the vertex coordinates, wherein the predetermined number depends on the tile width and tile height. In one example, translator 403 simply drops the five least significant bits (for a tile height and width of 32×32), and in this example screen 11 has a total of 128 tiles, so that a tile identifier is constructed by concatenating seven bits of each of the x and y coordinates.

Vertex tiler 221 also includes a line delta sorter 405 that receives the deltas from delta calculator 404, and sorts the deltas from top to bottom, thereby to determine whether the top segment or the bottom segment intersects with the middle vertex of the triangle. Since the vertices are in the clockwise order, if vertex (x0, y0) is the left most, and vertex (x1, y1) is the rightmost, and vertex (x2, y2) is the middle vertex, then the bottom segment intersects the middle vertex if y2<y1.

Vertex tiler 221 also includes a line function evaluator 406 that receives the sorted deltas from line delta sorter 405, and remainders of the integer division from vertex-to-tile translator 403 (via remainders bus 407A). Line function evaluator 406 computes values of the line function for each of the three line segments of the triangle, and supplies the values to function values bus 408A thereby to implement act 322 (see FIG. 3B). Specifically, line function evaluator 406 uses the following formula Ftop=((tile_width−left_rem_x)*top_dy)+(left_rem_y*top_dx), wherein tile_width is the width of the tile (e.g. 32 pixels), left_rem_x is the remainder of the integer division of the x coordinate of the left-most vertex by the tile width (e.g. 32 pixels) left_rem_y is the remainder of the integer division of the y coordinate of the left-most vertex by the tile height (e.g. 32 pixels), and top_dx and top_dy are the differences dx10 and dy10 (assuming the top line segment passes through the vertices (x0, y0) and (x1, y1)).

Function evaluator 406 uses similar formulae for the middle and bottom line segments of the triangle. Depending on the embodiment, vertex-to-tile translator 403 and line function evaluator 406 can operate on a single segment at a time, or operate simultaneously on two or more segments.

Segment scanner 222 (FIG. 4B) uses the signals provided by vertex tiler 221 (FIG. 4A) on buses 407B, 408 and 409 (that together form bus 227 in FIG. 2H) to implement operation 330 described above in reference to FIG. 3A. Note that in the embodiment illustrated in microfiche Appendix A, all blocks have a start input bus 227 (formed by buses 407B, 408 and 409) which loads values from vertex tiler 221.

Segment scanner 222 includes an x controller 410 (FIG. 4B) coupled to an edge walker 420 that in turn is coupled to a min-max detector 440. X controller 410 receives as input the starting column, and determines the location of a column that contains the current tile, and indicators of whether the current tile is in a column containing the middle tile or the last tile. Specifically, x controller 410 includes a control decoder 411 that controls a first multiplexer 412 (FIG. 4C) to generate a first output signal indicative of the current x coordinate or an incremented x coordinate (depending on the signal go_next_column being inactive or active respectively). Control decoder 411 also controls a second multiplexer 413 (FIG. 4C) to generate an output signal tile_x that is indicative of either the first output signal or an initialization signal start_left_x (that indicates the x coordinate of the left-most vertex tile).

Figure 4B:
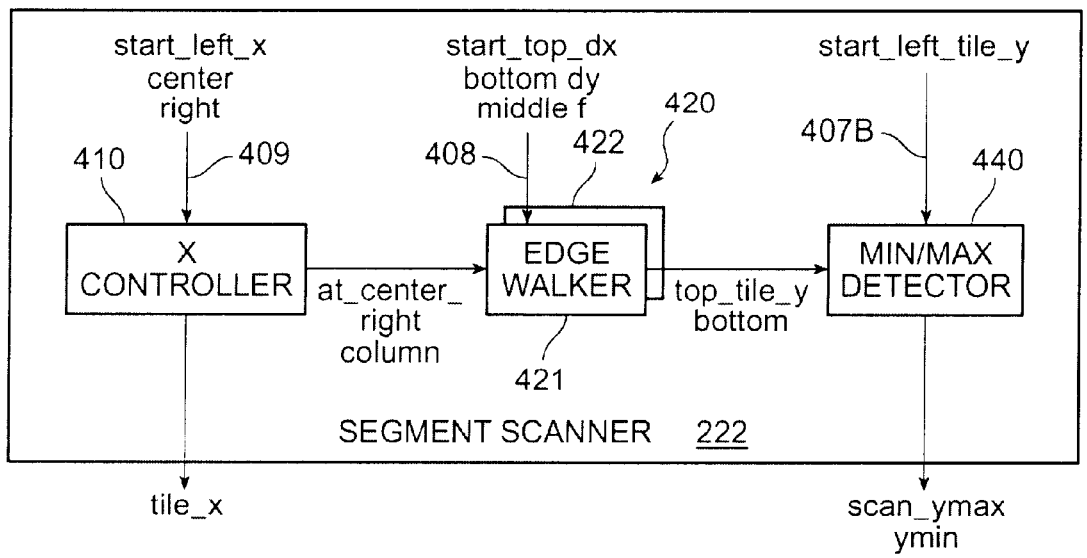
Figure 4C:
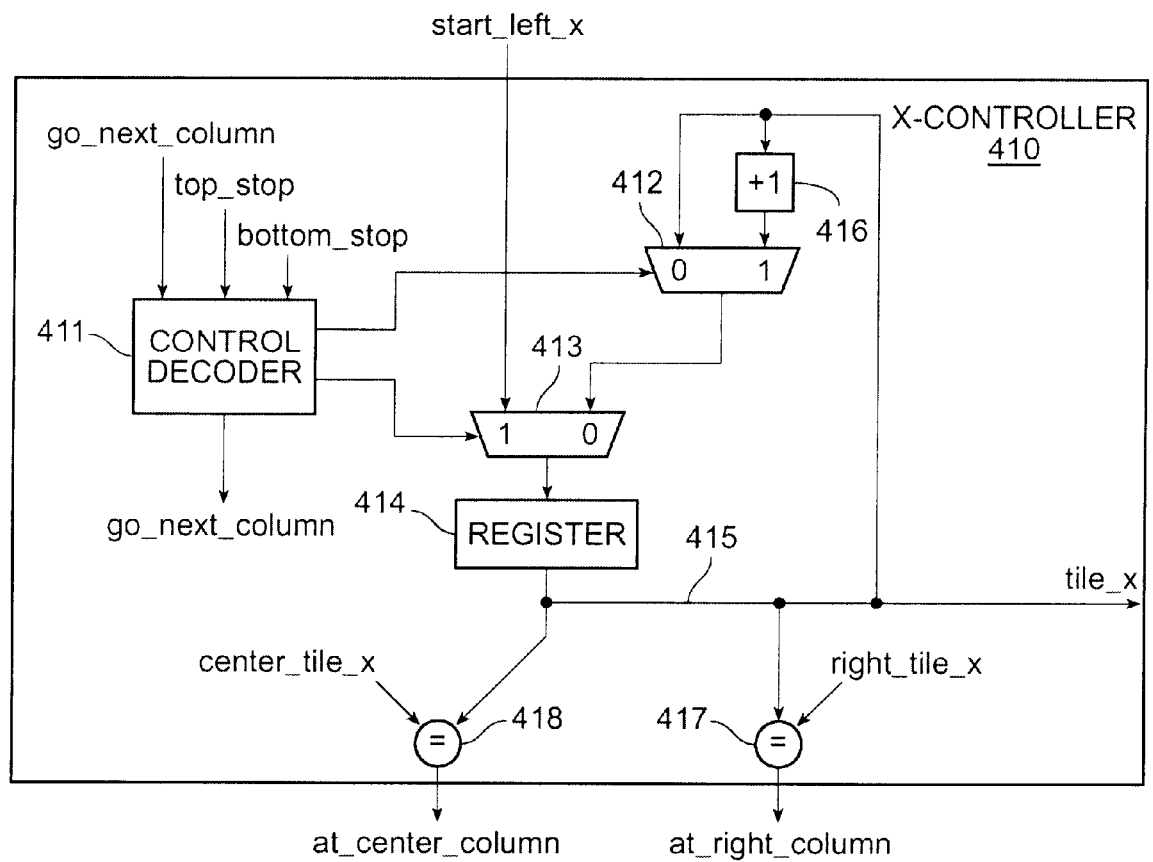
Figure 4D:
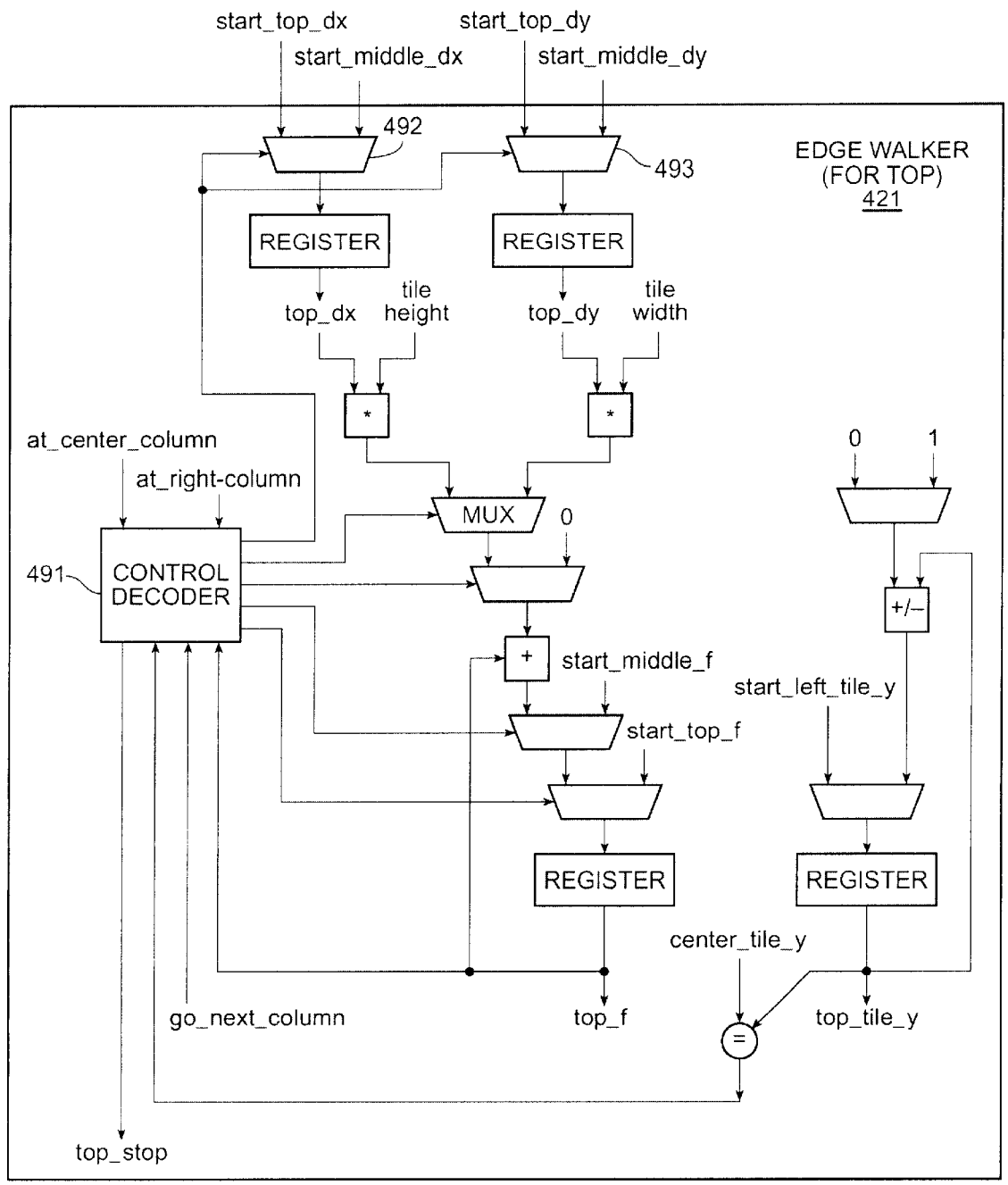
Figure 4E:
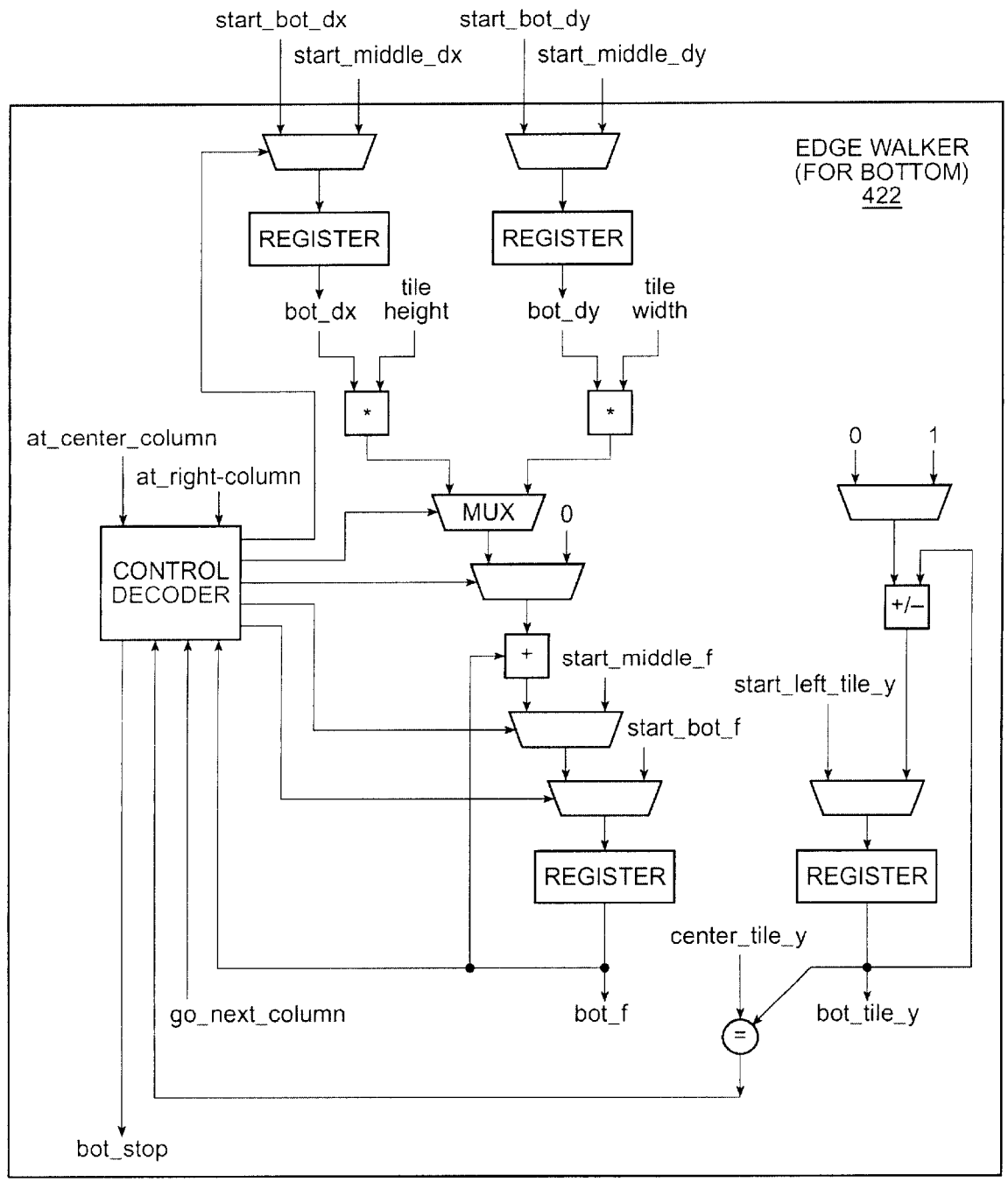
Figure 4F:
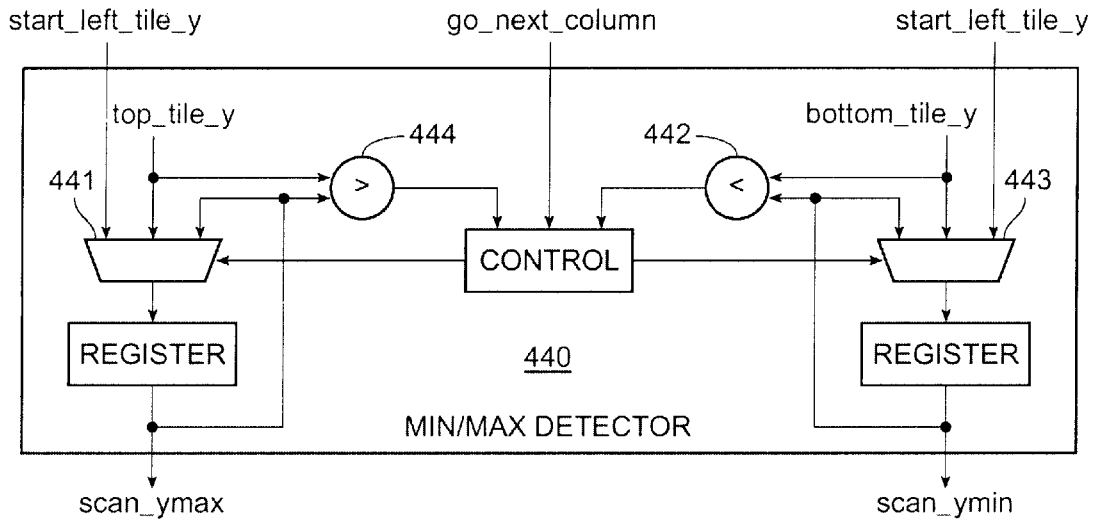
Figure 4G:
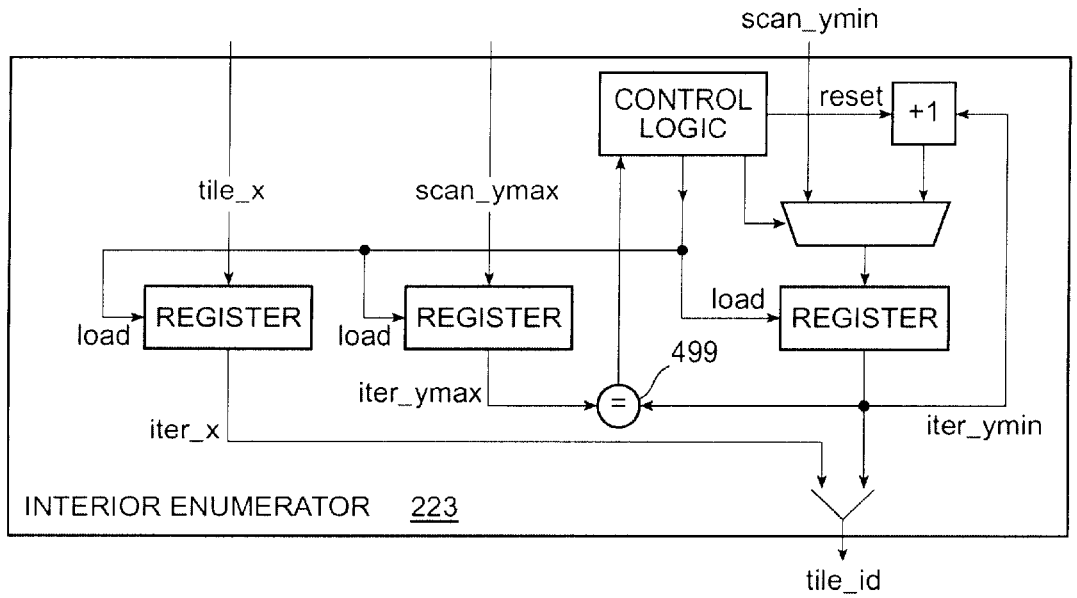

The second output signal tile_x is held in a register 414 (FIG. 4C), and is supplied to an output bus 415 (that is coupled to an adder 416 for use in incrementing the x coordinate), and is used by interior enumerator 223 (FIG. 4G). X controller 410 also includes comparators 417 and 418 that compare the output signal tile_x with signals center_tile_x and right_tile_x indicative of the x coordinates of the middle and last tiles, to drive signals at_center_column and at_right_column active (in case of a match). X controller 410 also generates a signal go_next_column when scanning is complete for the current column. Such generation of signal go_next_column is continued until the current tile is in the right-most column.

Edge walker 420 (FIG. 4B) includes two portions, a top walker 421 (FIG. 4D) and a bottom walker 422 (FIG. 4E) that are identical to each other except for the signals being processed therein. Specifically, top walker 421 processes the signals for the top current segment while bottom walker 422 processes the corresponding signals for the bottom current segment. For example, a control decoder 491 in top walker 421 (FIG. 4D) drives a control signal to multiplexers 492 and 493 to select a segment having as the end point the left-most vertex to be the current segment. Walkers 421 and 422 receive as inputs the starting tile location, the middle tile location, and the respective line functions.

Walkers 421 and 422 generate as outputs the control signals top_stop and bottom_stop that are used by X controller 410. Note that each of walkers 421 and 422 evaluates the line function by use of just one of following two increments Δy*stepx and Δx*stepy depending on whether the movement is horizontal or vertical. Specifically, at least one of the step increments, stepx and stepy can be zero during movement in each of directions D1–D6 if each of these directions is either horizontal or vertical.

Min-max detector 440 (FIG. 4F) receives as inputs the signals top_tile_y and bottom_tile_y, and generates as outputs the signals scan_ymin and scan_ymax indicative of whether a new minimum or a new maximum for the y coordinate has been set in the current column.

Interior enumerator 223 (FIG. 4G) uses the edge tiles (in the form of signals scan_ymax and scan_ymin, and tile_x) from segment scanner 222 to implement operation 341 (FIG. 3B). In the example of FIG. 2D, interior enumerator 223 iterates between two edge tiles in a column to identify tiles located between the two edge tiles.

Note that interior enumerator 223 of this embodiment also identifies the two edge tiles (that may also be vertex tiles) in a column, in addition to the interior tiles in the column, although the edge tiles were previously identified by the segment scanner. The tile identities provided by interior enumerator 223 are supplied as output signals of the triangle binner. Therefore, interior enumerator 223 as described herein eliminates the need to separately process the tile identities that were provided by the segment scanner, for supplying the output signals.

However, in an alternative embodiment only the interior tiles are identified by interior enumerator 223. In such an alternative embodiment, the previously identified edge tiles and vertex tiles are supplied by the triangle binner as output signals (thereby to identify all tiles covered by a convex polygon). Therefore, irrespective of the source within a triangle binner (such as vertex tiler, segment scanner and interior enumerator), the triangle binner can identify all tiles covered by a convex polygon.

Interior enumerator 223 of one implementation uses "tile coordinates" (defined to be coordinates in terms of the number of tiles from the origin in the x and y directions) that are obtained by integer division of the x and y coordinates with the tile width and tile height respectively. Specifically, interior enumerator 223 starts with the signal bottom_tile_y, as the y tile coordinate and increments it by 1 to obtain the y tile coordinate of the next interior tile. Interior enumerator 223 iterates in this manner until all tiles in a column that are covered by a triangle are identified (e.g. each tile between start tile T27 and end tile T9 in column C1 illustrated in FIG. 2D). Interior enumerator 223 repeats the iteration for every column between a first vertex tile and a last vertex tile.

Note that one or more acts described above in reference to FIGS. 3A–3C are performed by various circuit components illustrated in FIGS. 4A–4G as illustrated in the following table:

| Act (FIGS. 3A–3C) | Circuit component(s) (FIGS. 4A–4G) | Act (FIGS. 3A–3C) | Circuit component(s) (FIGS. 4A–4G) |
|---|---|---|---|
| 311 | 402 (FIG. 4A) | 312 | 403 (FIG. 4A) |
| 313 | 403 (FIG. 4A) | 314 | 413 (FIG. 4C), 441, 443 (FIG. 4F) |
| 321 | 492, 493, 496 (FIG. 4D) | 322 | 405, 406 (FIG. 4A) |
| 331 | 491 (FIG. 4D) | 332 | 492, 493 (FIG. 4D) |
| 333 | 411 (FIG. 4C) | 334 | 497 (FIG. 4D) |
| 341 | 223 (FIG. 4G) | 342 | 498 (FIG. 4G) |
| 343 | 223 (FIG. 4G) | 335 | 420 (FIG. 4B) |
| 352 | 442 (FIG. 4F) | 353 | 443 (FIG. 4F) |
| 354 | 444 (FIG. 4F) | 355 | 441 (FIG. 4F) |
| 361 | 494 (FIG. 4D) | 362 | 416, 412 (FIG. 4C) |
| 363 | 441, 443 (FIG. 4F) | 371 | 492, 493, 495, 496 (FIG. 4D) |

In two implementations of the invention, the number of tiles that were identified (also referred to as "binned") in certain tests are shown below:

| Test Name | # of tiles in approx. implementation | # of tiles in precise implementation |
|---|---|---|
| 1. Chapel | 4854 | 4342 |
| 2. Racetrack | 3393 | 2814 |
| 3. Station | 5065 | 4899 |
| 4. Tomb Raider II | 2470 | 2134 |

In a precise implementation (as described above), the triangle binner specifically identifies edge tiles, e.g. by use of a line function F (x, y). In contrast, in an approximate implementation of method 300 (FIG. 3A) the triangle binner does not perform operation 320. In the approximate implementation, the triangle binner computes (in operation 310) incremental movements (also called "step size") in each of x and y directions, e.g. by dividing the Δx and Δy (difference in end points) of each line segment by powers of 2, until the step size is less than the tile size in the direction of movement (width or height in the x or y direction).

Figure 5:
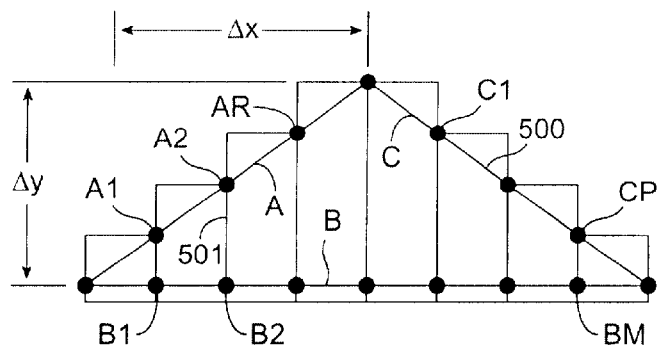
FIG. 5 illustrates points and bounding boxes used in an approximate implementation of the invention.

Thereafter, the triangle binner determines line segments A–C, wherein each line segment connects a pair of vertices of the convex polygon 500 (FIG. 5). Next, the triangle binner uses the step size (in operation 330 of FIG. 3A) to determine on each of line segments A–C the respective points A1–AR (wherein $1 \leq I \leq R$, R being the total number of points, also called "first points"), points B1–BM (wherein $1 \leq I \leq M$, M being the total number of points, also called "second points") and points C1–CP (wherein 1≦I≦P, P being the total number of points, also called "third points") as illustrated in FIG. 5.

Then, the triangle binner determines tiles that are located between two line segments (called top and bottom line segments) until the middle vertex is reached and thereafter switches line segments as described above. Specifically, the triangle binner uses points A1 and A2 on top line segment A, and points B1 and B2 on the bottom line segment B (in operation 340 of FIG. 3A) to create a bounding box 501 that is thereafter used in the normal manner to determine interior tiles.

Such use of bounding boxes results in one or more tiles (e.g. tile T3 in FIG. 2D) that are not touched by the primitive to be identified as being covered by the primitive. Therefore in the approximate implementation, edge tiles are not explicitly identified, and instead, one or more points on each line segment (also called "edges") are identified.

The first three tests listed above are Ziff Davis—3D Winbench '98 tests whereas the last test (labeled test 4) is an Eidos-Core test. The results (listed above) show a 10–15% reduction in the number of tiles being binned by use of the precise implementation, and such a reduction results in significant savings in processing power and memory (e.g. in binning memory 231 and renderer 216 illustrated in FIG. 2A) required downstream of a geometry tiler to process the binned tiles for display, because of the reduced number of tiles.

Note that if a triangle falls within a tile, then each of the two vertex tiles of a line segment are identical to the just-described tile, and the edge tile is also identical to the just-described tile. In such a case, the geometry tiler identifies only the just-described tile (as illustrated in the attached microfiche appendix), e.g. by performing act 331 and taking the "no" branch, act 332 and taking the "yes" branch, act 371, act 322, act 331 and taking the "no" branch, act 332 and taking the "no" branch, act 333 and taking the "yes" branch, act 341, act 342 and taking the "yes" branch, and act 343. Note that act 333 can be performed with waiting for the other segment to be done as described above (or alternatively act 333 may be performed with no waiting when only one tile is being traversed, which condition is determined by checking if the current tile is same as the middle tile and also same as the last tile). A similar set of acts are performed in the degenerate case when the graphics primitive is a line segment.

The following table indicates the locations in microfiche Appendix A at which various acts illustrated in FIG. 3C are performed.

| Acts in FIG. 3C | Microfiche Appendix A |
| --- | --- |
| 311 | page 8 bottom |
| 312 | page 8 bottom (first, middle and last are referred to as left, center and right) |
| 313 | page 13 bottom to page 14 top |
| 314 | page 14 upper middle |
| 321 | page 8 bottom, page 9, page 13 bottom and page 14 top |
| 322 | page 10 upper three quarters, page 11 second quarter and bottom third, and page 12 |
| 331 | page 14 bottom half (for top line segment), page 15 bottom, and page 16 top (for bottom line segment) |
| 332 | page 15 line 7 (for top line segment) and page 16 middle (for bottom line segment) |
| 333 | page 16 third quarter |
| 335 | see acts 351–355 |
| 341 | page 18 upper two thirds |
| 342 | page 16 bottom quarter |
| 351 | page 14 bottom half (for top line segment), page 15 bottom third, page 16 upper third (for bottom line segment) |
| 352–355 | page 15 upper quarter |
| 361, 362 | page 16 bottom quarter |
| 363 | page 14 middle |
| 371 | page 15 upper third (for top line segment), page 16 middle (for bottom line segment) |

Note that in the microfiche appendix, "render state" is referred to as "mode", "render command" is referred to as "command", "primitive bufer" is referred to as "vertex stack" and "render state controller" is referred to as "mode_ control".

In the above description, several embodiments, variants, and implementations of a geometry tiler are described by reference to various specific elements (acts or structures), although such elements are not essential to practicing the invention. Specifically, numerous modifications and adaptations of the above-described embodiments will be apparent to a person of skill in the art of designing geometry tilers in view of the enclosed disclosure. For example, instead of using projection distances Δx and Δy to determine the direction of a line segment, a geometry tiler can determine the line segment's slope, and use the sign of the slope to determine the direction.

As another example, instead of computing the projection distances from end points of the line segments of a triangle, the projection distances can be computed by use of the tile coordinates of the vertex tiles.

As still another example, although a modified form of a scan conversion algorithm (described in, for example, "Computer Graphics, Principles and Practice" by Foley et al, pages 73–78 incorporated by reference herein) is used to detect edge tiles, other algorithms can be used.

As yet another example, instead of moving up (or down) when the line function has a zero value at the testing corner during the scanning of a segment, the movement can be diagonal thereby to avoid identifying tiles that are merely touched. In this example, the number of binned tiles is further reduced (by identifying only tiles that are definitely covered), and therefore further improves the speed and memory requirements for displaying a convex polygon (as compared to binning of both covered tiles and tiles that are merely touched).

Figure 2G:
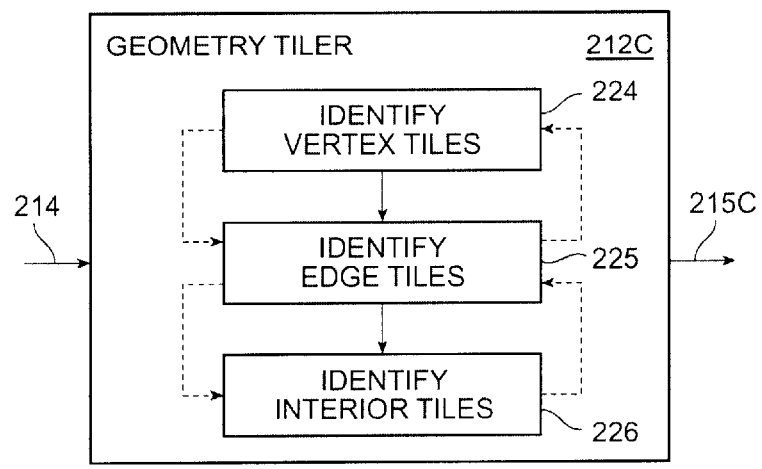
FIGS. 2G and 2H illustrate, in a high-level flow chart and a high-level block diagram respectively, still another embodiment of the geometry tiler illustrated in FIG. 2A.
Figure 2H:
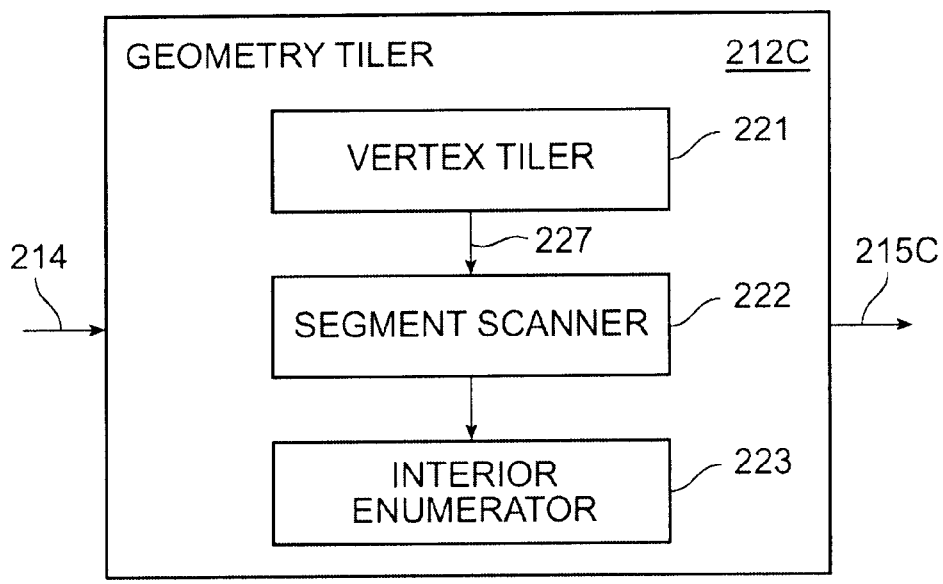

Also, in other embodiments, any prior acts (such as acts that use a bounding box) can be combined with one or more acts described herein (e.g. performed in a method of the type illustrated in FIG. 2G). In one such embodiment, acts of a bounding box method are used to determine tiles affected by a portion of a polygon, while one or more acts described herein are used to determine tiles affected by the remaining portion of the polygon. For example, acts illustrated in FIG. 3 (described above) are used to exclude tiles outside one side (e.g. the hypotenuese of a right angled triangle), while acts of the bounding box method are used to exclude tiles outside a box that contains the remaining sides. In such an embodiment, only one edge walker of the type illustrated in FIG. 4B is used, and therefore reduces the amount of hardware otherwise required to implement precise binning.

Various such modifications and adaptations of the embodiments, variants, and implementations described herein are encompassed by the attached claims.

What is claimed is:

1. A method implemented in a computer for identifying from among a plurality of tiles to be displayed on a screen a group of tiles that are covered by a polygon, the polygon having at least a first line segment, the first line segment having two end points, the method comprising:

identifying from said plurality of tiles a first vertex tile, said first vertex tile being covered by a first end point of the first line segment, wherein
the first end point has an x coordinate and a y coordinate; and
said identifying the first vertex tile includes driving on a first group of lines in the computer a signal obtained by dividing the x coordinate with a width of a selected tile from said plurality of tiles and driving on a second group of lines in the computer a signal obtained by dividing the y coordinate with a height of the selected tile;

identifying from said plurality of tiles a second vertex tile, said second vertex tile being covered by a second endpoint of the first line segment; and subsequent to identifying the fist vertex tile and subsequent to identifying the second vertex tile, identifying from said plurality of tiles an edge tile, said edge tile being located between the first vertex tile and the second vertex tile, said edge tile being covered by the first line segment.

2. The method of claim 1 wherein the edge tile is hereinafter the first edge tile, and the primitive includes a second line segment that intersects the first line segment at the fist end point, the second line segment having a third end point, the method further comprising:

identifying from said plurality of tiles, still another tile hereinafter third vertex tile, said third vertex file being covered by the third end point; and subsequent to identifying each of the first vertex tile, the second vertex tile and the third vertex tile:
identifying from said plurality of tiles, yet another tile hereinafter second edge tile, said second edge tile being covered by the second line segment and being located between the first vertex tile and the third vertex tile.

3. The method of claim 2 further comprising:

subsequent to identifying the first edge tile and the second edge tile:
identifying one or more tiles hereinafter interior tiles from the plurality of tiles, each interior tile being located between said first edge tile and said second edge tile.

4. A method implemented in a computer for identifying from among a plurality of tiles to be displayed a group of tiles that are covered by a polygon, the polygon having at least a first line segment, the first line segment having two end points, the method comprising:

identifying from the plurality of tiles a fist vertex tile, the first vertex tile being covered by a first end point of the first line segment;

identifying from the plurality of tiles a second vertex tile, the second vertex tile being covered by a second end point of the first lie segment; and subsequent to identifying the first vertex tile and identifying the second vertex tile:
initializing the first vertex tile to be a current tile;
initializing the first line segment to be a current line segment;
determining a covered side of the current tile, the covered side being covered by the current segment and located between a first end point and a second end point of the current segment;
selecting as an edge tile the tile located adjacent to the covered side of the current tile; and
repeating each of said determining and said selecting while using said edge tile as the current tile and said fist line segment as the current line segment, thereby to select another edge tile.

5. The method of claim 4 wherein the primitive includes a second line segment that intersects the first line segment at the first end point, the second line segment having a third end point in addition to the first end point, the method further comprising:

identifying from said plurality of tiles, yet another tile hereinafter third vertex tile, the third vertex tile being covered by the third end point;

initializing the first vertex tile to be the current tile;

initializing the second line segment to be the current segment; and repeating each of said determining and said selecting while using said first vertex tile as the current tile and said second line segment as the current line segment, thereby to select a second edge tile.

6. The method of claim 5 wherein the primitive includes a third line segment that intersects the first line segment at the second end point and intersects the second line segment at the third end point, the method further comprising:

initializing the third line segment to be the current segment;

initializing one of the second vertex tile and the third vertex tile to be a start tile, and the other of the second vertex tile and the third vertex tile to be an end tile; and repeating each of said determining and said selecting, while using said start vertex tile as the current tile and said third line segment as the current line segment, thereby to select a third edge tile.

7. The method of claim 4 further comprising:

identifying a first corner of the current tile as a testing corner based on the slope of the current line segment; and computing the value of a function indicative of the position of the current line segment relative to the testing corner.

8. The method of claim 4 wherein each vertex tile has an x coordinate in the direction of the width of the vertex tiles, and a y coordinate in the direction of the height of the vertex tiles, and the determining further includes:

computing a first projection distance, hereinafter $\Delta x$, as the difference between the x coordinates of the first end point and the second end point;

computing a second projection distance, hereinafter $\Delta y$, as the difference between the y coordinates of the first end point and the second end point; and the value of the function at a testing corner of a tile adjacent to the first vertex tile is computed using a function based on computing at least one of the products $\Delta y * stepx$ and $\Delta x * stepy$, wherein:
stepx is the width of the vertex tiles; and
stepy is the height of the vertex tiles.

9. The method of claim 8 further comprising:
selecting as the current tile, a tile that is located adjacent to the first vertex tile in the upward direction if the value of the function has a predetermined sign and the current line segment is above another line segment of the polygon; and
selecting as the current tile, another tile that is located adjacent to the first vertex tile in the downward direction if the value of the function has the sign opposite to the predetermined sign and the current line segment is below said another line segment of the polygon.

10. The method of claim 9 wherein the primitive includes a second line segment that intersects the first line segment at the first end point, the second line segment having a third end point in addition to the first end point, the determining further includes:
computing $\Delta x$ as the difference between x coordinates of the first end point and the third end point;
computing $\Delta y$ as the difference between y coordinates of the first end point and the third end point; and
determining the value at yet another testing corner of another tile that is adjacent to the first vertex tile.

11. The method of claim 4 wherein the polygon has a plurality of vertices, and the method further comprises:
comparing coordinates of the vertices to identify as a start vertex tile the tile covered by a left most vertex in said plurality of vertices, and to identify as an end vertex tile another tile covered by a right most vertex in said plurality of vertices; and
identifying each tile covered by a line segments located between the start tile and the end tile.

12. The method of claim 4 wherein:
said polygon is contained with a single tile, each of said first vertex tile, said second vertex tile and said edge tile are identical to said single file, and each of said identifying occurs simultaneously thereby to identify said single tile.

13. A method implemented in a computer for identifying from among a plurality of tiles to be displayed on a screen a group of tiles that are covered by a polygon, the polygon having at least a first line segment and a second line segment, each tile including an equal number of pixels, the method comprising:
identifying each edge tile, that is covered by the first line segment by:
initializing a tile that is covered by an endpoint of the first line segment to be the current tile;
initializing the first line segment to be the current segment; and
computing the value of a function indicative of the position of the current line segment relative to a corner of the current tile;
identifying each edge tile, that is covered by the second line segment; and
subsequent to identifying each edge tile that is covered by the first line segment and identifying each edge tile that is covered by the second line segment, identifying a plurality of interior tiles, each interior tile being located between two edge tiles, one of the two edge tiles being covered by the first line segment and the other of the two edge tiles being covered by the second line segment.

14. The method of claim 13 wherein
identifying of each edge tile covered by the first line segment is performed simultaneously with identifying of each edge tile covered by the second line segment.

15. The method of claim 14 wherein:
the primitive includes a third line segment that intersects at least one of the first line segment and the second line segment; and
the method further comprises identifying each tile, hereinafter edge tile, that is covered by the third line segment.

16. The method of claim 15 wherein:
identifying each edge tile covered by the third line segment is performed simultaneous with one of:
identifying each edge tile covered by the first line segment; and
identifying each edge tile covered by the second line segment.

17. The method of claim 13 wherein each tile in said plurality of tiles has an x coordinate and a y coordinate, and the first line segment has a first end point and a second end point, and the method further includes:
computing a first projection distance, hereinafter $\Delta x$, as the difference between the x coordinates of the first end point and the second end point of the first line segment;
computing a second projection distance, hereinafter $\Delta y$, as the difference between the y coordinates of the first end point and the second end point; and
using the first projection distance and the second projection distance to compute said value of said function.

18. The method of claim 17 wherein each tile has a width of stepx and a height of stepy, and the method further includes:
computing, by using the equation Fnew=Fold+$\Delta y$*stepx−$\Delta x$*stepy, the value of a function at a corner hereinafter current corner, of a tile hereinafter current tile that is located adjacent to a first vertex tile, the first vertex tile being covered by an endpoint of the first line segment, wherein Fold is an initial value of the function at a first corner of the first vertex tile.

19. The method of claim 18 wherein the equation is reduced to Fnew=Fold+$\Delta y$*stepx when the current corner is located along a horizontal direction relative to the first corner.

20. The method of claim 18 wherein the equation is reduced to Fnew=Fold+$\Delta x$*stepy when the current corner is located along a vertical direction relative to the first corner.

21. The method of claim 13 wherein each tile has a width of stepx and a height of stepy, and the method further includes:
computing, by using the equation F=Ax+By+C, the value of a function at a corner hereinafter current corner, of a tile hereinafter current tile that is located adjacent to a first vertex tile, the first vertex tile being covered by an endpoint of the first line segment, wherein A=$\Delta y$, B=−$\Delta x$ and C=($\Delta x$)(y)−($\Delta y$)(x).

22. The method of claim 13 wherein the polygon has a plurality of vertices, and the method farther comprises:
identifying as a start vertex tile a tile covered by a left most vertex in said plurality of vertices;

identifying as an end vertex tile another tile covered by a right most vertex in said plurality of vertices; and identifying each tile covered by a line segment of the polygon and located between the start tile and the end tile.

23. The method of claim 13 being devoid of identification of a tile not touched or covered by the polygon.

24. The method of claim 13 further comprising:

selecting a first corner of a tile in said group of tiles as a testing corner, based on a direction of scanning and slope of the first line segment; and computing the value of a line function indicative of the position of the first line segment relative to the testing corner.

25. The method of claim 24 wherein:

said scanning direction is from left to right;

said testing corner is the upper right corner if the slope of the first line segment is positive; and said testing corner is the lower right corner if the slope of the first line segment is negative.

* * * * *